United States Patent [19]

Aufdembrink et al.

[11] Patent Number: 5,258,114
[45] Date of Patent: Nov. 2, 1993

[54] ULTRA LARGE PORE CRACKING CATALYST AND PROCESS FOR CATALYTIC CRACKING

[75] Inventors: Brent A. Aufdembrink, Wilmington, Del.; Arthur W. Chester, Cherry Hill; Joseph A. Herbst, Turnersville, both of N.J.; Charles T. Kresge, West Chester, Pa.

[73] Assignee: Mobil Oil Corporation, Fairfax, Va.

[21] Appl. No.: 735,227

[22] Filed: Jul. 24, 1991

Related U.S. Application Data

[63] Continuation-in-part of Ser. No. 470,008, Jan. 25, 1990, Pat. No. 5,102,643, and Ser. No. 625,245, Dec. 10, 1990, Pat. No. 5,098,684, which is a continuation-in-part of Ser. No. 470,008, Dec. 10, 1990.

[51] Int. Cl.$^5$ .............................................. C10G 11/05
[52] U.S. Cl. ..................... 208/113; 208/118; 208/120
[58] Field of Search .................. 208/118, 72, 113, 120

[56] References Cited

U.S. PATENT DOCUMENTS

| | | | |
|---|---|---|---|
| 4,309,280 | 1/1982 | Rosinski et al. | 208/120 |
| 5,057,296 | 10/1991 | Beck | 423/277 |
| 5,102,643 | 4/1992 | Kresge et al. | 423/328 |

OTHER PUBLICATIONS

"Ultralarge Pore Molecular Sieves", P. A. Jacobs & R. A. vanSanten, 1989 Elsevier Science Publishers, pp. 439-446.

Primary Examiner—Theodore Morris
Assistant Examiner—Walter D. Griffin
Attorney, Agent, or Firm—Alexander J. McKillop; Malcolm D. Keen; Richard D. Stone

[57] ABSTRACT

A process and catalyst for catalytic cracking comprising a non-layered, ultra-large pore crystalline material. The crystalline material preferably has a benzene adsorption capacity greater than about 15 grams benzene/100 grams at 50 torr and 25° C. Preferred materials have a hexagonal electron diffraction pattern that can be indexed with a $d_{100}$ value greater than about 18 Angstrom Units and a hexagonal arrangement of uniformly sized pores with a maximum perpendicular cross section of at least about 13 Angstrom units. Preferred cracking catalysts comprise ultra-large pore materials having pore openings formed by at least 20 tetrahedrally coordinated members, most preferably with 36 or 42 tetahedrally coordinated members.

20 Claims, 26 Drawing Sheets

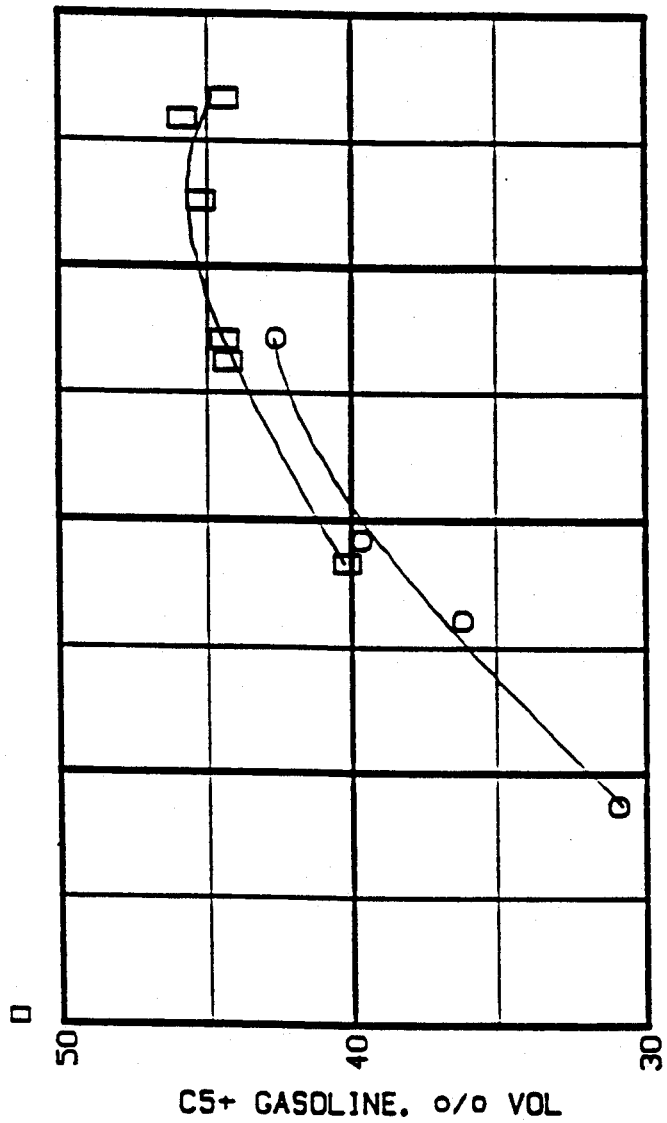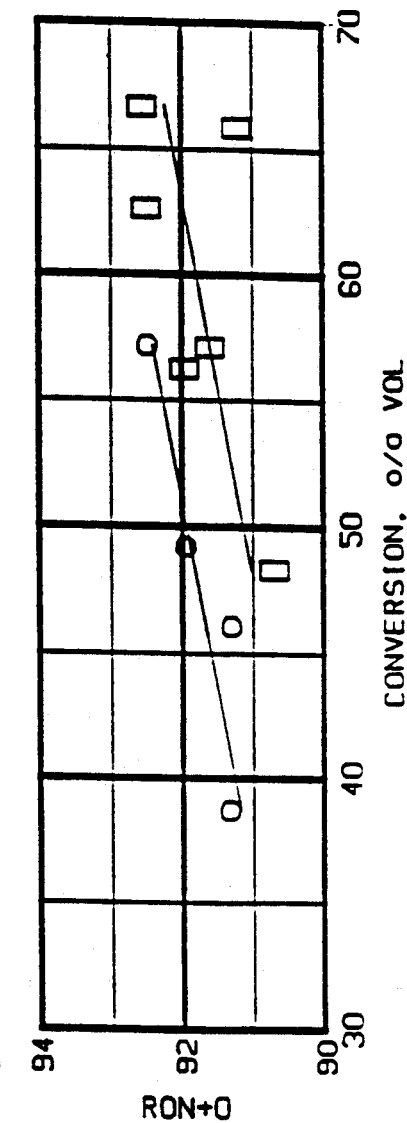
FIG. 23A
FIG. 23B

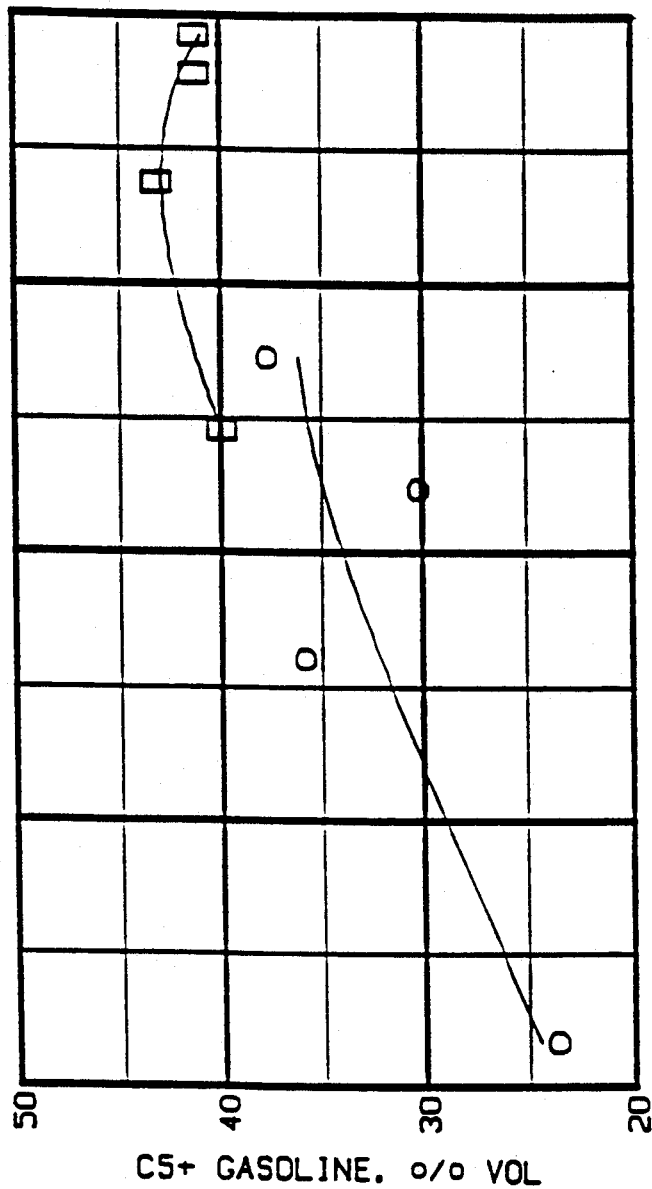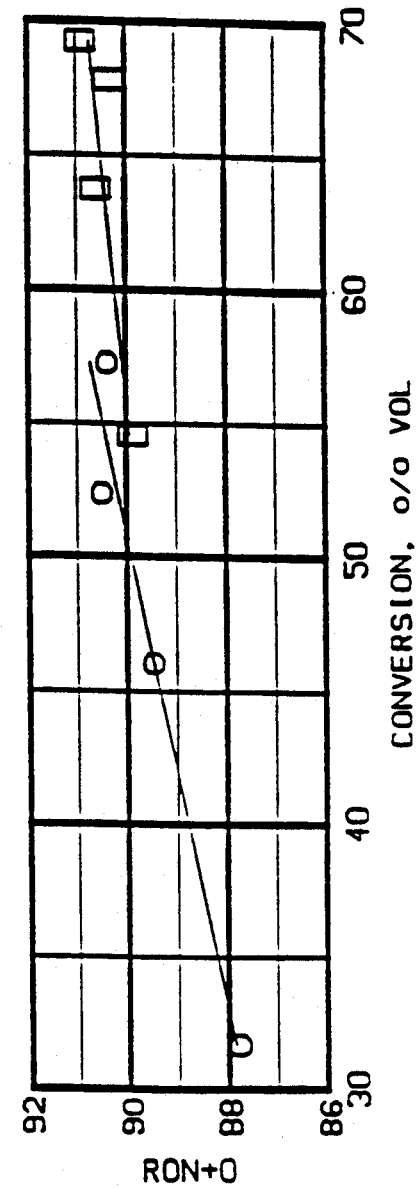
FIG. 25A
FIG. 25B

ULTRA LARGE PORE CRACKING CATALYST AND PROCESS FOR CATALYTIC CRACKING

CROSS REFERENCE TO RELATED APPLICATIONS

This is a continuation-in-part of two prior co-pending applications Ser. No. 07/625,245, filed Dec. 10, 1990, now U.S. Pat. No. 5,098,684 issued Mar. 24, 1992, and Ser. No. 07/470,008, filed Jan. 25, 1990, now U.S. Pat. No. 5,102,643 issued Apr. 7, 1992. Ser. No. 07/625,245 was also a continuation-in-part of Ser. No. 07/470,008.

FIELD OF THE INVENTION

This invention relates to catalytic cracking of heavy hydrocarbon oils to produce liquid hydrocarbons boiling in the gasoline and distillate range.

The present invention can best be understood in the context of its contribution to conventional FCC catalysts and processes.

Conversion of heavy petroleum fractions to lighter products by catalytic cracking is well known in the refining industry. Fluidized Catalytic Cracking (FCC) is particularly advantageous for that purpose. The heavy feed contacts hot regenerated catalyst and is cracked to lighter products. Carbonaceous deposits form on the catalyst, thereby deactivating it. The deactivated (spent) catalyst is separated from cracked products, stripped of strippable hydrocarbons and charged to a regenerator, where coke is burned off the catalyst with air, thereby regenerating the catalyst. The regenerated catalyst is then recycled to the reactor. The reactor-regenerator assembly are usually maintained in heat balance. Heat generated by burning the coke in the regenerator provides sufficient thermal energy for catalytic cracking in the reactor. Control of reactor conversion is usually achieved by controlling the flow of hot regenerated catalyst to the reactor to maintain the desired reactor temperature.

In most modern FCC units hot regenerated catalyst is added to the feed at the base of a riser reactor. The fluidization of the solid catalyst particles may be promoted with a lift gas. Mixing and atomization of the feedstock may be promoted with steam, equal to 1-5 wt % of the hydrocarbon feed. Hot catalyst (above 650° C.) from the regenerator is mixed with preheated (150°-375° C.) charge stock. The catalyst vaporizes and superheats the feed to the desired cracking temperature usually 450°-600° C. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products are fractionated into a series of products, including gas, gasoline, light gas oil, and heavy cycle gas oil. Some heavy cycle gas oil may be recycled to the reactor. The bottoms product, a "slurry oil", is conventionally allowed to settle. The catalyst rich solids portion of the settled product may be recycled to the reactor. The clarified slurry oil is a heavy product.

The "reactor vessel" into which the riser discharges primarily separates catalyst from cracked products and unreacted hydrocarbons and permits catalyst stripping.

Older FCC units use some or all dense bed cracking. Down flow operation is also possible, in which case catalyst and oil are added to the top of a vertical tube, or "downer," with cracked products removed from the bottom of the downer. Moving bed analogs of the FCC process, such as Thermofor Catalytic Cracking (TCC) are also known.

Further details on FCC can be found in U.S. Pat. No. 3,152,065 (Sharp et al); U.S. Pat. No. 3,261,776 (Banman et al); U.S. Pat. No. 3,654,140 (Griffel et al); U.S. Pat. No. 3,812,029 (Snyder); U.S. Pat. Nos. 4,093,537, 4,118,337, 4,118,338, 4,218,306 (Gross et al); U.S. Pat. No. 4,444,722 (Owen); U.S. Pat. No. 4,459,203 (Beech et al); U.S. Pat. No. 4,639,308 (Lee); U.S. Pat. Nos. 4,675,099, 4,681,743 (Skraba) as well as in Venuto et al, Fluid Catalytic Cracking With Zeolite Catalysts, Marcel Dekker, Inc. (1979). These patents and publication are incorporated herein by reference.

Conventional FCC catalysts usually contain finely divided acidic zeolites comprising e.g., faujasites, such as Rare Earth Y (REY), Dealuminized Y (DAY), Ultrastable Y (USY), Rare Earth Ultrastable Y (RE-USY), silicon enriched dealuminized Y and Ultrahydrophobic Y (UHP-Y).

Typically, FCC catalysts are fine particles having particle diameters ranging from about 20 to 150 microns and an average diameter around 60-80 microns.

Catalyst for use in moving bed catalytic cracking units (e.g., TCC units) can be in the form of spheres, pills, beads, or extrudates, and can have a diameter ranging from 1 to 6 mm.

Although many advances were made in catalytic cracking, and in cracking catalysts, some problem areas remain.

Catalytic cracking is excellent for converting gas oil and vacuum gas oil feeds to lighter hydrocarbons. Conventional cracking catalysts, including those containing large pore zeolites such as X and Y, do not do a very good job cracking the larger molecules in the feed. There is a growing need in refineries to convert more of the "bottom of the barrel" or resid fractions into lighter components via catalytic cracking. Many FCC units today add 5-15 wt % resid to the catalytic cracking unit. Such heavy materials are now primarily cracked by the amorphous, acidic matrix such as silica-alumina. Such "bottoms" are not readily cracked by conventional large pore zeolites.

We wanted to develop a catalyst and process which could more efficiently crack extremely large molecules. A way has now been discovered to crack them, and at much greater efficiency than can be achieved by cracking of these same fractions over amorphous catalytic materials.

BRIEF SUMMARY OF THE INVENTION

Accordingly, the present invention provides in a catalytic cracking process wherein a crackable hydrocarbon feedstock is cracked in a catalytic cracking means at catalytic cracking conditions by contact with a circulating inventory of catalytic cracking catalyst to produce catalytically cracked products, the improvement comprising use of a cracking catalyst comprising catalytically effective amounts of a non-layered, ultra large pore crystalline material exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C.

In another embodiment, the invention provides an improved catalytic cracking process by using a cracking catalyst comprising an inorganic, porous crystalline material having, after calcination, a hexagonal arrangement of uniformly-sized pores having diameters of at least about 13 Angstrom Units and exibiting a hexagonal electron diffraction pattern that can be indexed with a $d_{100}$ value greater than about 18 Angstrom Units.

In another embodiment, the present invention provides a catalytic cracking catalyst for catalytic cracking of a feedstock containing at least 10 wt % of hydrocarbons boiling above about 950° F., in the absence of added hydrogen, to lighter products, comprising 5 to 60 wt % non-layered, ultra large pore crystalline material having a benzene adsorption capacity of greater than about 15 grams benzene/100 grams at 50 torr and 25° C. and uniformly sized pores with a pore opening of at least about 13 Angstrom units; and being essentially free of added hydrogenation components; and a matrix.

BRIEF DESCRIPTION OF THE DRAWINGS

FIGS. 1a-15 are X-ray diffraction patterns of products of Examples 1-14 and 16, respectively, hereinafter presented.

FIGS. 22A-25B show data on cracking with catalyst of the invention compared to prior art catalyst.

DETAILED DESCRIPTION

Figure 1:
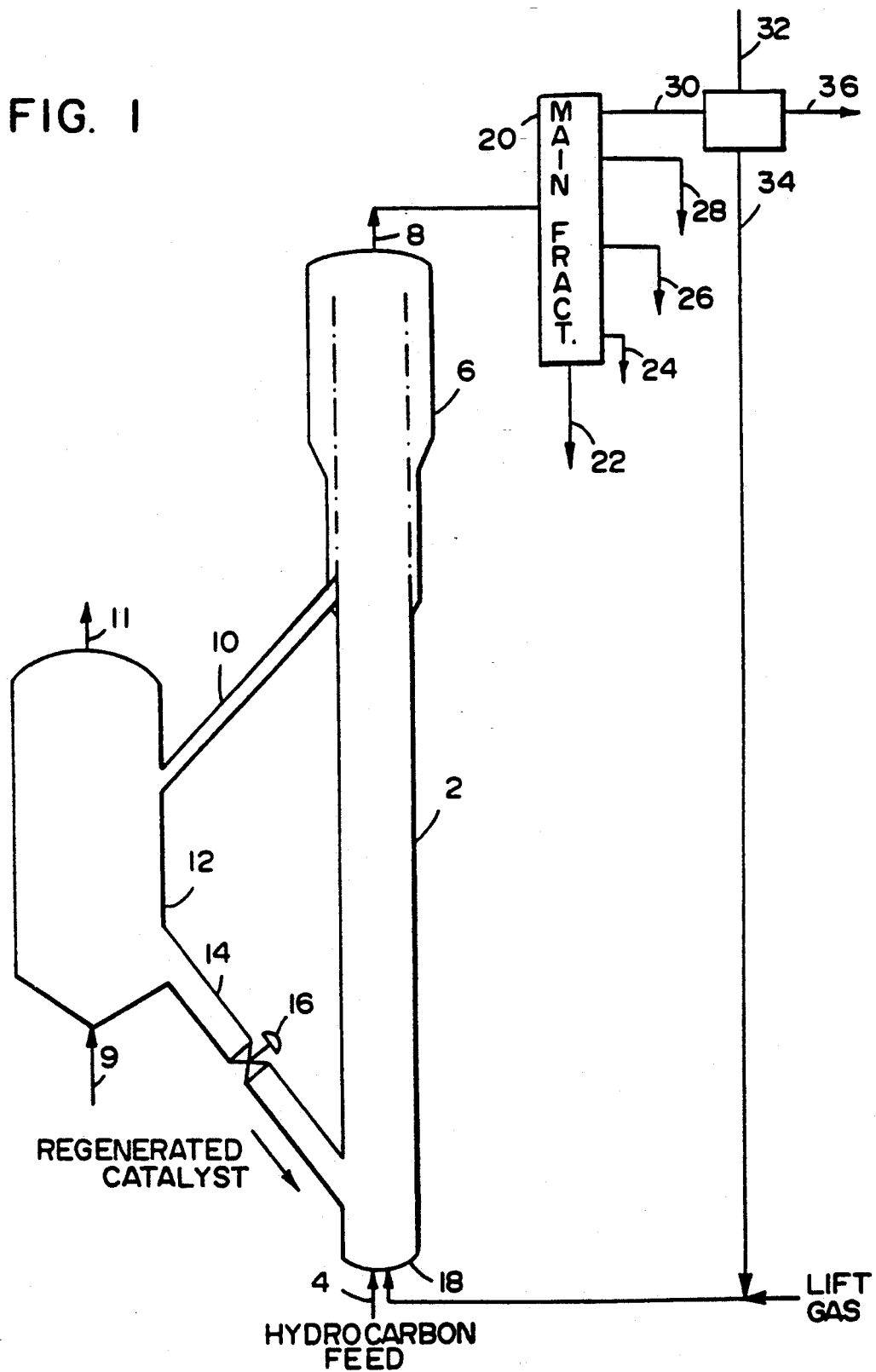
FIG. 1 is a schematic diagram of a conventional FCC reactor and regenerator.
Figure 1A:
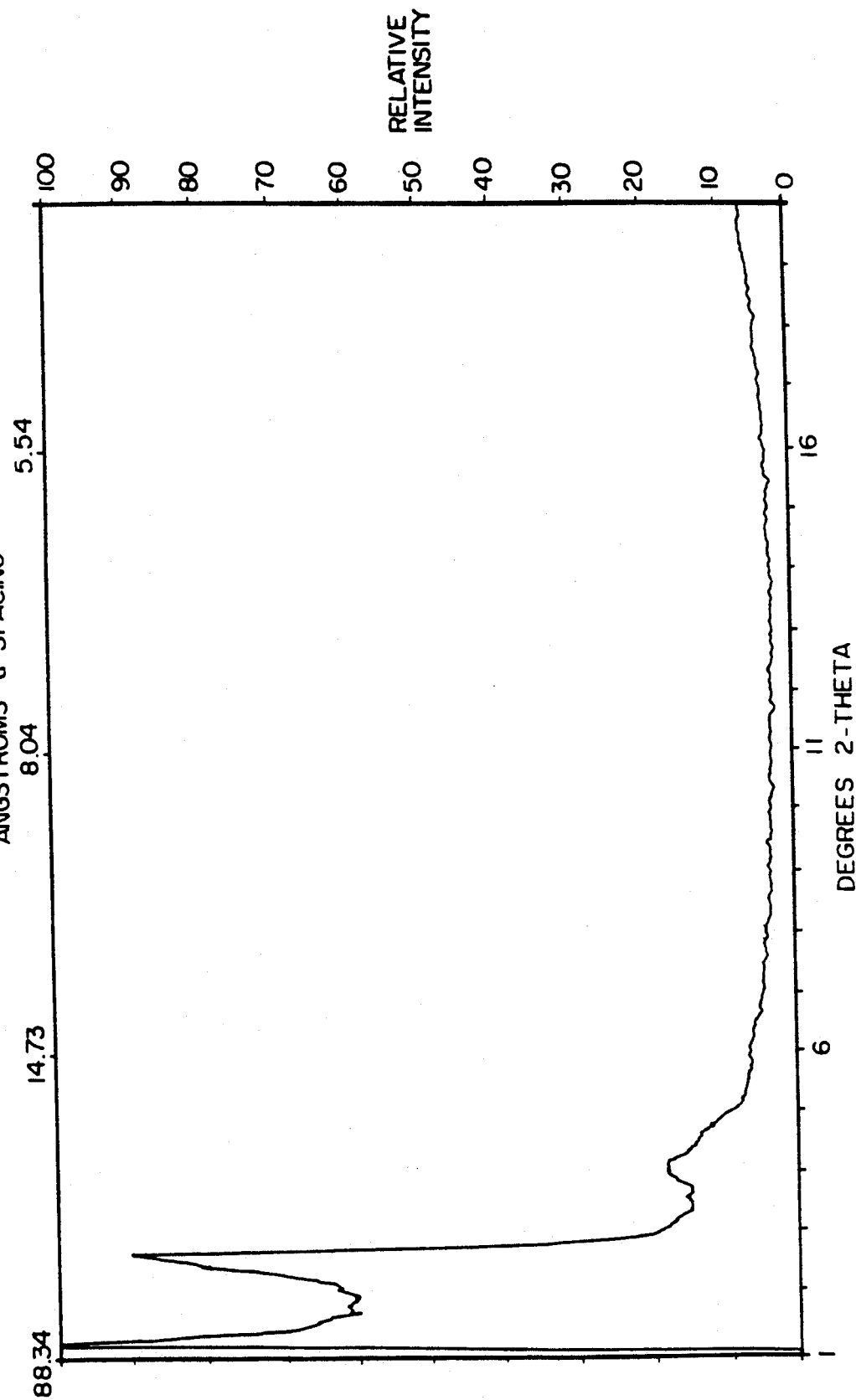

FIG. 1, is a schematic flow diagram of an exemplary FCC unit. Feed is charged to the bottom of the riser reactor 2 via inlet 4. Hot regenerated catalyst is added via conduit 14, equipped with a flow control valve 16. A lift gas is introduced near the liquid and solid feed inlets via conduit 18. The riser reactor is an elongated, cylindrical smooth-walled tube.

The feed vaporizes and forms a dilute phase suspension with the FCC catalyst. The suspension passes up the riser, which generally gets wider to accommodate volumetric expansion. Cracked products and coked catalyst may pass into a solid-vapor separation means, such as a conventional cyclone. Preferably, the riser has a deflector and a short residence time stripper, as disclosed in U.S. Pat. No. 4,629,552 (Haddad and Owen) incorporated by reference. Another good design is the closed cyclone design disclosed in U.S. Pat. No. 4,749,471 (Kam et al) which is incorporated by reference. A means for stripping entrained hydrocarbons from the catalyst is usually provided in the base of vessel 6. Neither this stripping section, nor the solid-gas separation equipment is shown in the drawing for clarity. Such equipment is conventional. Cracked products are withdrawn from the reactor by conduit 8.

Stripped catalyst containing coke is withdrawn via conduit 10 and charged to regenerator 12. The catalyst is regenerated by contact with an oxygen-containing gas, usually air added via line 9. Flue gas is withdrawn from the regenerator by line 11.

Usually the feed temperature is about 150° C. to 375° C. The regenerator operates at about 650° C. to 750° C. and the catalyst to feed weight ratio is usually about 3:1 to 10:1, adjusted as necessary to hold a reactor outlet of about 450° C. to 550° C.

Cracked product from the FCC unit passes via line 8 to main fractionator 20, where product is separated into a heavy slurry oil stream 22, heavy distillate 24, light distillate 26, naphtha 28, and a light overhead stream 30, rich in C2-C4 olefins, C1-C4 saturates, and other light cracked gas components. This light stream is usually treated in an unsaturated gas plant 32 to recover various light gas streams, including a C3-C4 LPG stream via line 36, and optionally $C_2^-$ fuel gas or the like via line 35. Preferably a light, $H_2$ rich gas stream is recycled from the gas plant via line 34 for use as all, or part, of a lift gas used to contact catalyst in the base of riser 2.

The catalyst and process of the present invention work well in the conventional FCC units described above, and in TCC units.

FEEDS

Conventional feeds may be used. Most FCC and TCC units crack gas oil or vacuum gas oil feeds, i.e., those having an initial boiling point above 400°-500° F., and an end boiling point above 750°-850° F. The process tolerates feed including wholly or partly non-distillable fraction, e.g. boiling above 1000° F. boiling range material. Resids, deasphalted resids, tar sands, shale oils, coal liquids and similar heavy material, may be used as part or all of the feed.

CATALYTIC CRACKING CONDITIONS

Conventional catalytic cracking conditions may be used. More details may be taken from the patents which have been incorporated by reference.

ULTRA LARGE PORE CRACKING CATALYST

The catalysts used herein contain catalytically effective amounts of an ultra-large pore material such as MCM-41 and a matrix component. Preferably, additional conventional large pore molecular sieves such as X or Y, and shape selective zeolites such as ZSM-5 are also present. The catalyst components perform complementary, but different functions.

The Ultra-Large Pore Cracking Catalyst (ULPCC) comprises:
1) A matrix
2) An ultra large pore crystalline material such as MCM-41 and optionally comprises one or more of:
3) A large pore molecular sieve, preferably zeolite Y
4) A shape selective molecular sieve, e.g., ZSM-5.

MATRIX

The matrix can be conventional. The function of the matrix in catalytic cracking catalyst is well known. Briefly stated, it protects the relatively soft and fragile molecular sieve components from physical damage. The matrix acts to some extent as a sodium and metals sink, and minimizes localized high temperatures when burning coke from the molecular sieve.

The matrix also may act as an efficient metals getter or sink. Metal getters, e.g., BaO, MgO, CaO, $La_2O_3$, Ce₂O₃ and similar alkaline and/or rare earth compounds may be present as part of the matrix, or as separate additives.

ULTRA LARGE PORE CRACKING COMPONENT

The ultra large pore molecular sieve cracking component may be zeolite or similar crystalline material having 30-80 Angstrom pores.

A preferred material is MCM-41, the preparation and characterizations of which is disclosed in U.S. Ser. No. 07/625,245, which is a continuation-in-part of application Ser. No. 470,008, filed Jan. 25, 1990. Both of these applications are incorporated herein by reference. Details on preparation and characterization of these materials is reported below.

The preferred material, MCM-41, is a novel synthetic ultra-large pore crystalline material. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100-250 Angstrom particles of dense amorphous silica (*Kirk-Othmer Encyclopedia of Chemical Technology*, 3rd Edition, Vol. 20, John Wiley & Sons, New York, p. 766-781, 1982), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions ( K. Wefers and Chanakya Misra, "Oxides and Hydroxides of Aluminum", Technical Paper No. 19 Revised, Alcoa Research Laboratories, p. 54-59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (U.S. Pat. No. Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicate of varying alumina and metal content.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "H₁" phase or hydrate of aluminum phosphate of F.d'Yvoire, *Memoir Presented to the Chemical Society,* No. 392, "Study of Aluminum Phosphate and Trivalent Iron", Jul. 6, 1961 (received), pp. 1762–1776. This material, when crystalline, is identified by the JCPDS International Center for Diffraction Data card number 15-274. Once heated to 110° C. the d'Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12–13 Angstroms in diameter are taught in U.S. Pat. No. 4,880,611.

A naturally occurring, highly hydrated basic ferric oxyphosphate mineral, cacoxenite, is reported by Moore and Shen, *Nature,* Vol. 306, No. 5941, pp. 356–358 (1983) to have a framework structure containing very large channels with a calculated free pore diameter of 14.2 Angstroms. R. Szostak et al., *Zeolites: Facts, Figures, Future,* Elsevier Science Publishers B.V., 1989, present work showing cacoxenite as being very hydrophilic, i.e. absorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e. silicoaluminophosphates of particular structures are taught in U.S. Pat. No. 3,355,246 (i.e. ZK-21) and U.S. Pat. No. 3,791,964 (i.e. ZK-22). Other teachings of silicoaluminophosphates and their synthesis include U.S. Pat. No. 4,673,559 (two-phase synthesis method); U.S. Pat. No. 4,623,527 (MCM-10); U.S. Pat. No. 4,639,358 (MCM-1); U.S. Pat. No. 4,647,442 (MCM-2); U.S. Pat. No. 4,664,897 (MCM-4); U.S. Pat. No. 4,638,357 (MCM-5); and U.S. Pat. No. 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. UK 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

As demonstrated hereinafter, the inorganic, non-layered mesoporous crystalline material of this invention has the following composition:

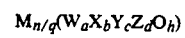

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1.

A preferred embodiment of the above crystalline material is when (a+b+c) is greater than d, and h=2. A further embodiment is when a and d=0, and h=2.

In the as-synthesized form, the MCM-41 material has a composition, on an anhydrous basis, expressed empirically as follows:

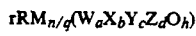

$$rRM_{n/q}(W_aX_bY_cZ_dO_h)$$

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g. sodium or chloride, ions of the as-synthesized material of this invention can be replaced in accordance with techniques well known in the art, at least in part, by ion exchange with other ions. Preferred replacing ions include metal ions, hydrogen ions, hydrogen precursor, e.g. ammonium, ions and mixtures thereof. Particularly preferred ions are those which tailor the catalytic activity for certain hydrocarbon conversion reactions. These include hydrogen, rare earth metals and metals of Groups IA (e.g. K), IIA (e.g. Ca), VIIA (e.g. Mn), VIIIA (e.g. Ni),IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures thereof.

The crystalline (i.e. meant here as having sufficient order to provide a diffraction pattern such as, for example, by X-ray, electron or neutron diffraction, following calcination with at least one peak) mesoporous material of this invention may be characterized by its heretofore unknown structure, including extremely large pore windows, and high sorption capacity. The term "mesoporous" is used here to indicate crystals having uniform pores within the range of from about 13 Angstroms to about 200 Angstroms. The materials of this invention will have uniform pores within the range of from about 13 Angstroms to about 200 Angstroms, more usually from about 15 Angstroms to about 100 Angstroms. For the purposes of this application, a working definition of "porous" is a material that adsorbs at least 1 gram of a small molecule, such as Ar, $N_2$, n-hexane or cyclohexane, per 100 grams of the solid.

Figure 19:
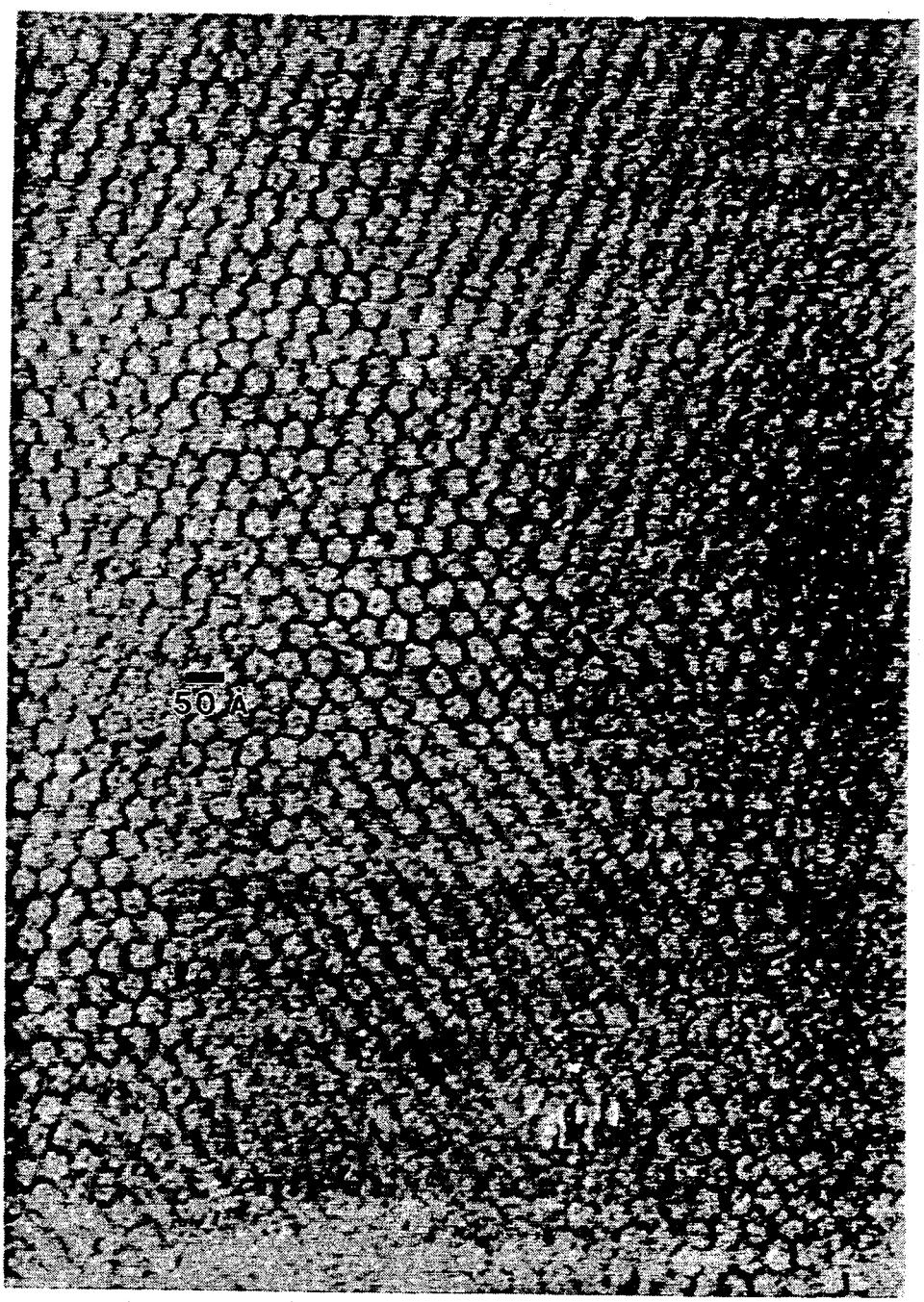
FIG. 19 is a transmission electron micrograph of the product of Example 4.
Figure 20:
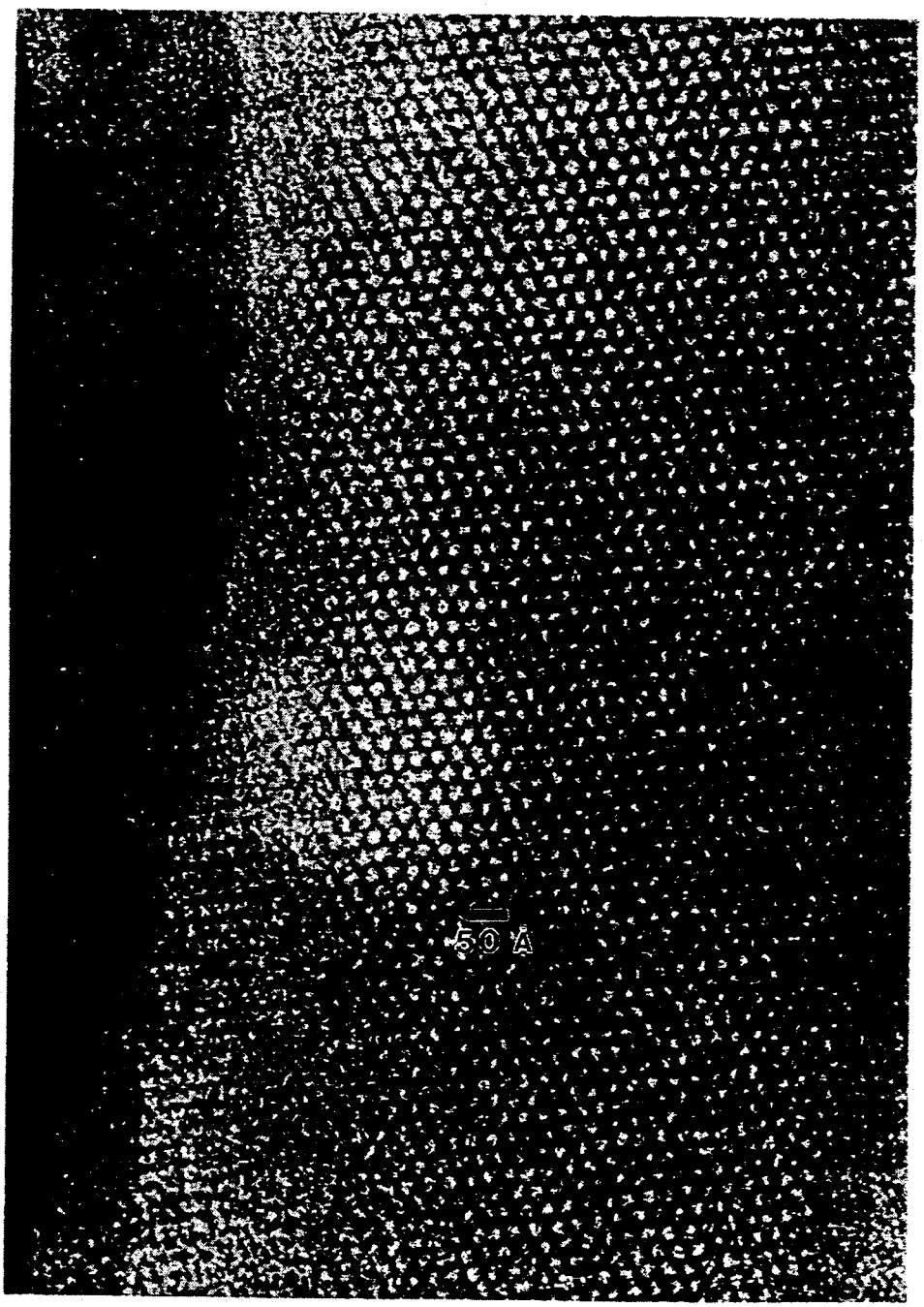
FIG. 20 is a transmission electron micrograph of the product of Example 5.
Figure 21:
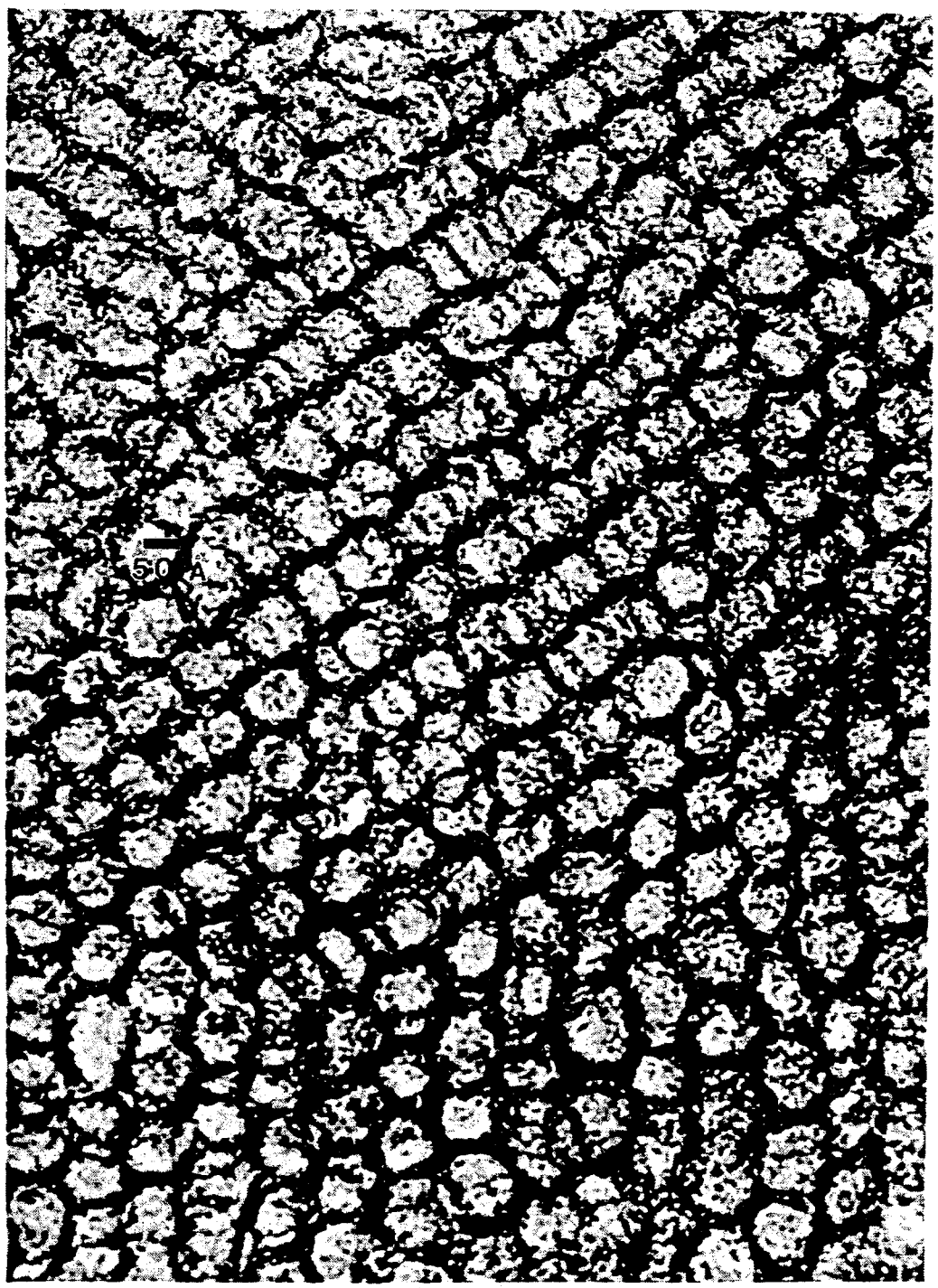
FIG. 21 is a transmission electron micrograph of the product of Example 19.

The material of the present invention can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The material appears to have a hexagonal arrangement of large open channels that can be synthesized with open internal diameters from about 13 Angstroms to about 200 Angstroms. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns. Transmission electron micrographs of materials within this working definition are shown in FIGS. 19, 20, and 21.

The most regular preparations of the material of the present invention give an X-ray diffraction pattern with a few distinct maxima in the extreme low angle region. The positions of these peaks approximately fit the positions of the hkO reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hkO subset of unique reflections of 100, 110, 200, 210, etc., and their symmetry-related reflections.

In its calcined form, the crystalline material of the invention may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal of the invention.

More particularly, the calcined crystalline non-layered material of the invention may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined material of this invention will have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Still more particularly, the calcined inorganic, non-layered crystalline material of the invention is characterized as having a pore size of about 13 Angstroms or greater as measured by physisorption measurements, hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. MCM-41 may require more highly collimated incident X-ray beams in order to resolve the low angle peak from the transmitted incident X ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75-100), s=strong (50-74), m=medium (25-49) and w=weak (0-24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as described hereinafter.

The MCM-41 may be treated to remove part or all of any organic constituent, or in some cases it may simply be left it, leaving the catalytic cracking catalyst regenerator to do the job of burning out the organics.

The MCM-41 may be beneficially given a thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C.

The crystalline material should usually be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The present crystalline material can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, hereinafter more particularly described. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinafter more particularly described, and a solvent or solvent mixture, such as, for example, $C_1$-$C_6$ alcohols, $C_1$-$C_6$ diols and/or water, especially water, said reaction mixture having a composition, in terms of mole ratios of oxides, within the following ranges:

| REACTANTS | USEFUL | PREFERRED |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |

-continued

| REACTANTS | USEFUL | PREFERRED |
|---|---|---|
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the present material.

A second method for synthesis of the present crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, hereinafter more particularly described. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each hereinafter more particularly described, and a solvent or solvent mixture, such as, for example, $C_1-C_6$ alcohols, $C_1-C_6$ diols and/or water, especially water, said reaction mixture having a composition, in terms of mole ratios of oxides, within the following ranges:

| REACTANTS | USEFUL | PREFERRED |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 2.0 | 0.12 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis of the present crystalline material is where X comprises aluminum and Y comprises silicon, the crystallization temperature must be from about 25° C. to about 175° C., preferably from about 50° C. to about 150° C., and an organic directing agent, hereinafter more particularly described, or, preferably a combination of that organic directing agent plus an additional organic agent, hereinafter more particularly described, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1-C_6$ alcohols, $C_1-C_6$ diols and/or water, especially water, said reaction mixture having a composition, in terms of mole ratios of oxides, within the following ranges:

| REACTANTS | USEFUL | PREFERRED |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_2/O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods of the present invention include:

| W | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

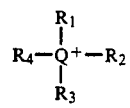

wherein Q is nitrogen or phosphorus and wherein at least one of $R_1$, $R_2$, $R_3$ and $R_4$ is aryl or alkyl of from 6 to about 36 carbon atoms, e.g. —$C_6H_{13}$, —$C_{10}H_{21}$, and —$C_{16}H_{33}$ and —$C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In order to more fully illustrate the nature of the invention and the manner of practicing same, the following examples are presented. In the examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g/ and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is absorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

In the examples, percentages are by weight unless otherwise indicated.

EXAMPLE 1

One hundred grams of cetyltrimethylammonium (CTMA) hydroxide solution, prepared by contacting a 29 wt. % N,N,N-trimethyl-1-hexadecanaminium chloride solution with a hydroxide-for-halide exchange resin, was combined with 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle, which was kept in a steam box at 95° C. overnight. The mixture had a composition in terms of moles per mole $Al_2O_3$:

2.7 moles $Na_2O$
392 moles $SiO_2$
35.7 moles $(CTMA)_2O$
61.7 moles $(TMA)_2O$
6231 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 475 $m^2/g$ and the following equilibrium adsorption capacities in grams/100 grams:

| | |
|---|---|
| $H_2O$ | 8.3 |
| Cyclohexane | 22.9 |
| n-Hexane | 18.2 |
| Benzene | 21.5 |

The X-ray diffraction pattern of the calcined product of this example is shown in FIG. 1. In this and the following Figures, it is noted that 10 Angstrom Units d-spacing corresponds to 8.842 degrees 2-theta (Cu K-alpha radiation) and 18 Angstrom Units corresponds to 4.909 degrees.

The product of this example may be characterized as including a very strong relative intensity line at 37.8±2.0 Angstroms d-spacing, and weak lines at 21.6±1.0 and 19.2±1.0 Angstroms. The present ultra-large pore material was demonstrated to be in the product of this example by transmission electron microscopy (TEM), which produced images of a hexagonal arrangement of uniform pores and hexagonal electron diffraction pattern with a $d_{100}$ value of about 39 Angstroms.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture had a composition in terms of moles per mole $Al_2O_3$:

2.7 moles $Na_2O$
291 moles $SiO_2$
35.7 moles $(CTMA)_2O$
102 moles $(TMA)_2O$
6120 moles $H_2O$ The resulting solid was recovered by filtration and dried in air at ambient temperature. The product was then calcined at 540° C. for 1 hour in nitrogen, followed by 6 hours in air. The calcined product had a surface area of 993 $m^2/g$ and the following equilibrium adsorption capacities in grams/100 grams:

| | |
|---|---|
| $H_2O$ | 7.1 |
| Cyclohexane | 47.2 |
| n-Hexane | 36.2 |
| Benzene | 49.5 |

Figure 2:
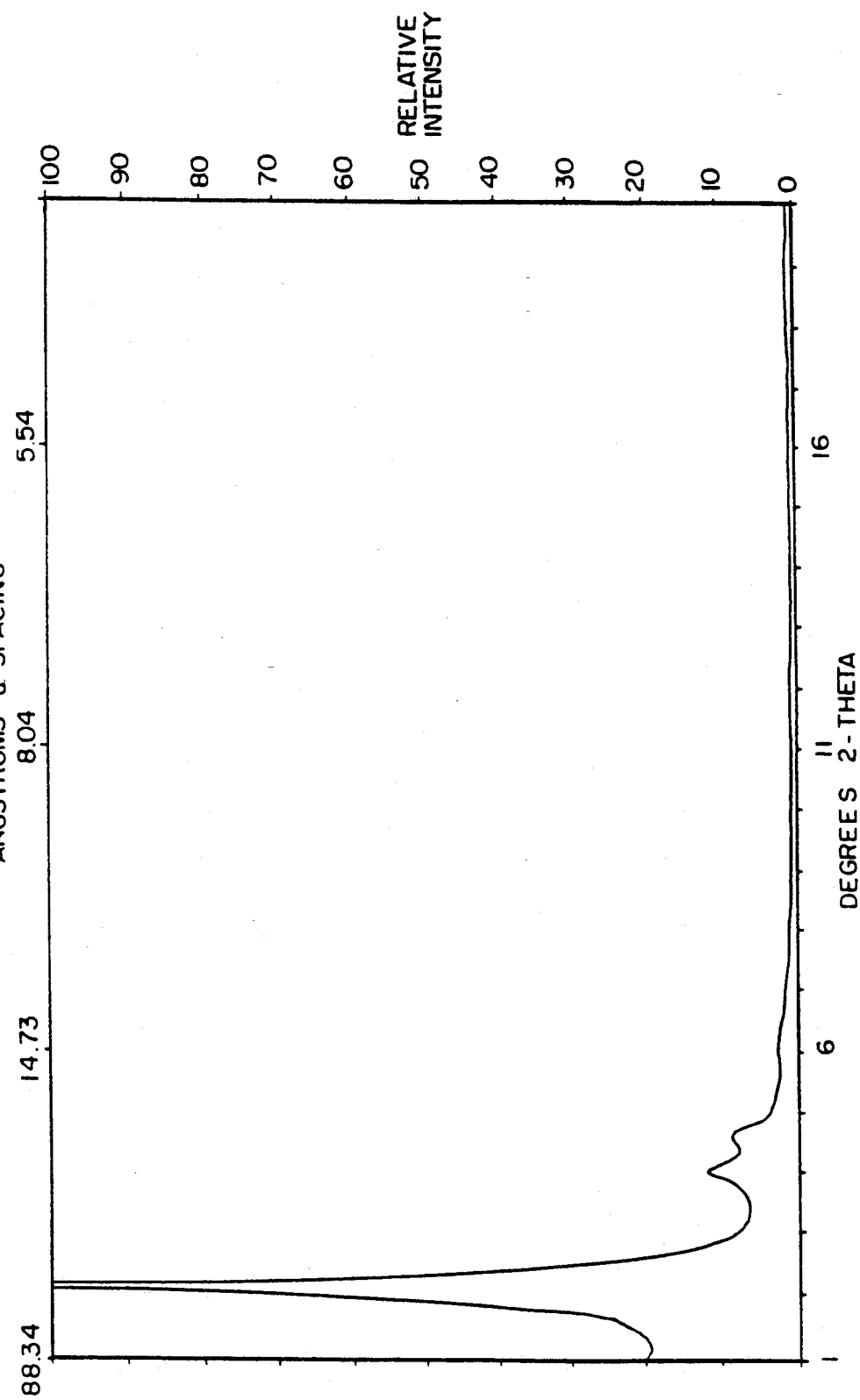

The X-ray diffraction pattern of the calcined product of this example is shown in FIG. 2. It may be characterized as including a very strong relative intensity line at 39.3±2.0 Angstroms d-spacing, and weak lines at 22.2±1.0 and 19.4±1.0 Angstroms. TEM indicated that the product contained the present ultra-large pore material.

A portion of the above product was then contacted with 100% steam at 1450° F. for two hours. The surface area of the steamed material was measured to be 440 m²/g, indicating that about 45% was retained following severe steaming.

Another portion of the calcined product of this example was contacted with 100% steam at 1250° F. for two hours. The surface area of this material was measured to be 718 m²/g, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole $Al_2O_3$:
0.65 moles $Na_2O$
65 moles $SiO_2$
8.8 moles $(CTMA)_2O$
1.22 moles $(TPA)_2O$
1336 moles $H_2O$ The resulting mixture was placed in a polypropylene bottle, which was kept in a steam box at 95° C. for 192 hours. The sample was then cooled to room temperature and combined with CTMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C overnight. The combined mixture had a composition in terms of moles per mole $Al_2O_3$:
0.65 moles $Na_2O$
65 moles $SiO_2$
15 moles $(CTMA)_2O$
1.22 moles $(TPA)_2O$
35.6 moles $(TMA)_2O$
2927 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1085 m²/g and the following equilibrium adsorption capacities in grams/100 grams:

| | |
|---|---|
| $H_2O$ | 11.5 |
| Cyclohexane | >50 |
| n-Hexane | 39.8 |
| Benzene | 62 |

Figure 3:
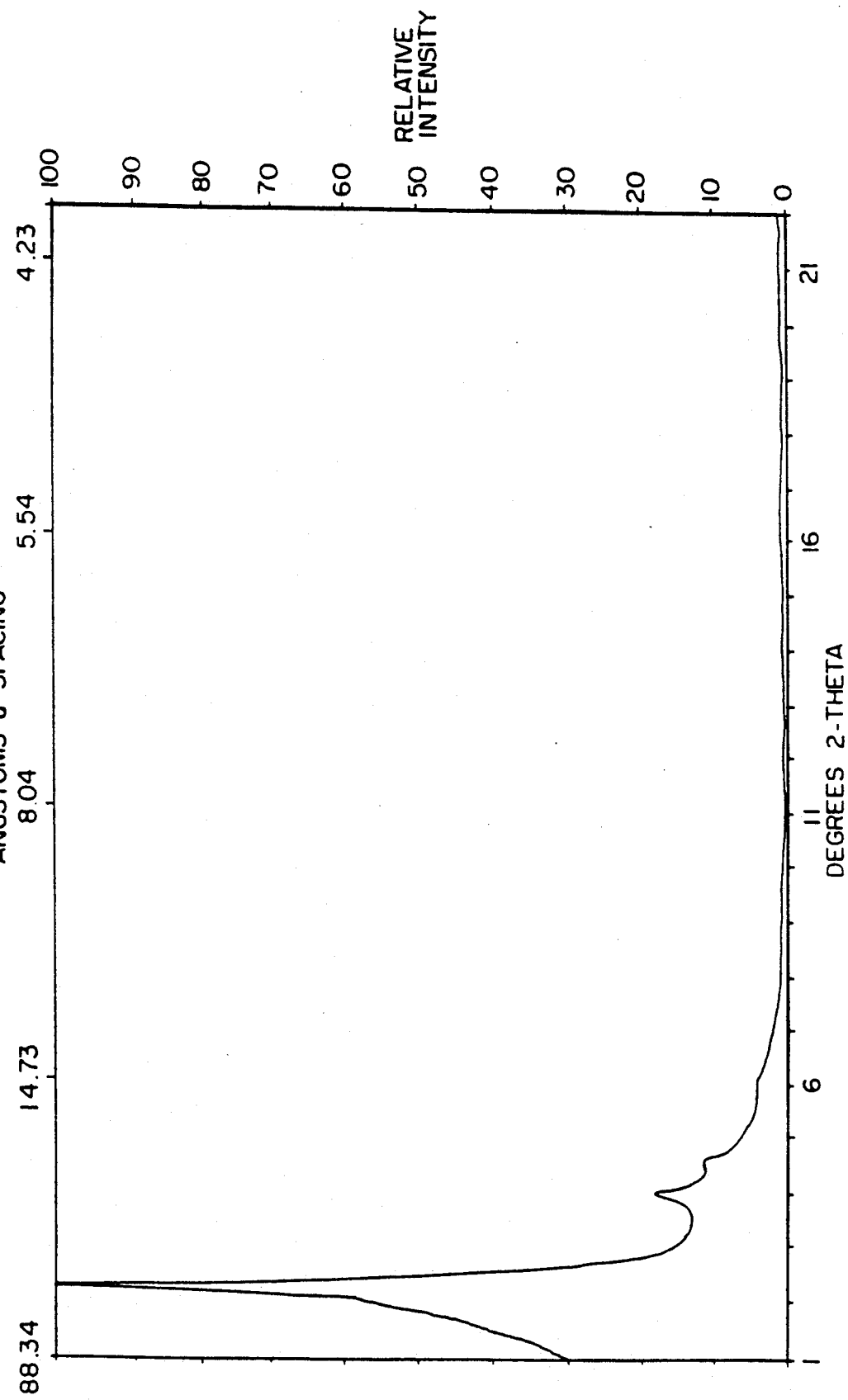

The X-ray diffraction pattern of the calcined product of this example is shown in FIG. 3. The product of this example may be characterized as including a very strong relative intensity line at 38.2±2.0 Angstroms d-spacing, and weak lines at 22.2±1.0 and 19.4±1.0 Angstroms. TEM indicated the product contained the present ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 48 hours. The mixture had a composition in terms of moles per mole $Al_2O_3$:
0.23 moles $Na_2O$
33.2 moles $SiO_2$
6.1 moles $(CTMA)_2O$
5.2 moles $(TMA)_2O$
780 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1043 m²/g and the following equilibrium adsorption capacities in grams/100 grams:

| | |
|---|---|
| $H_2O$ | 6.3 |
| Cyclohexane | >50 |
| n-Hexane | 49.1 |
| Benzene | 66.7 |

Figure 4:
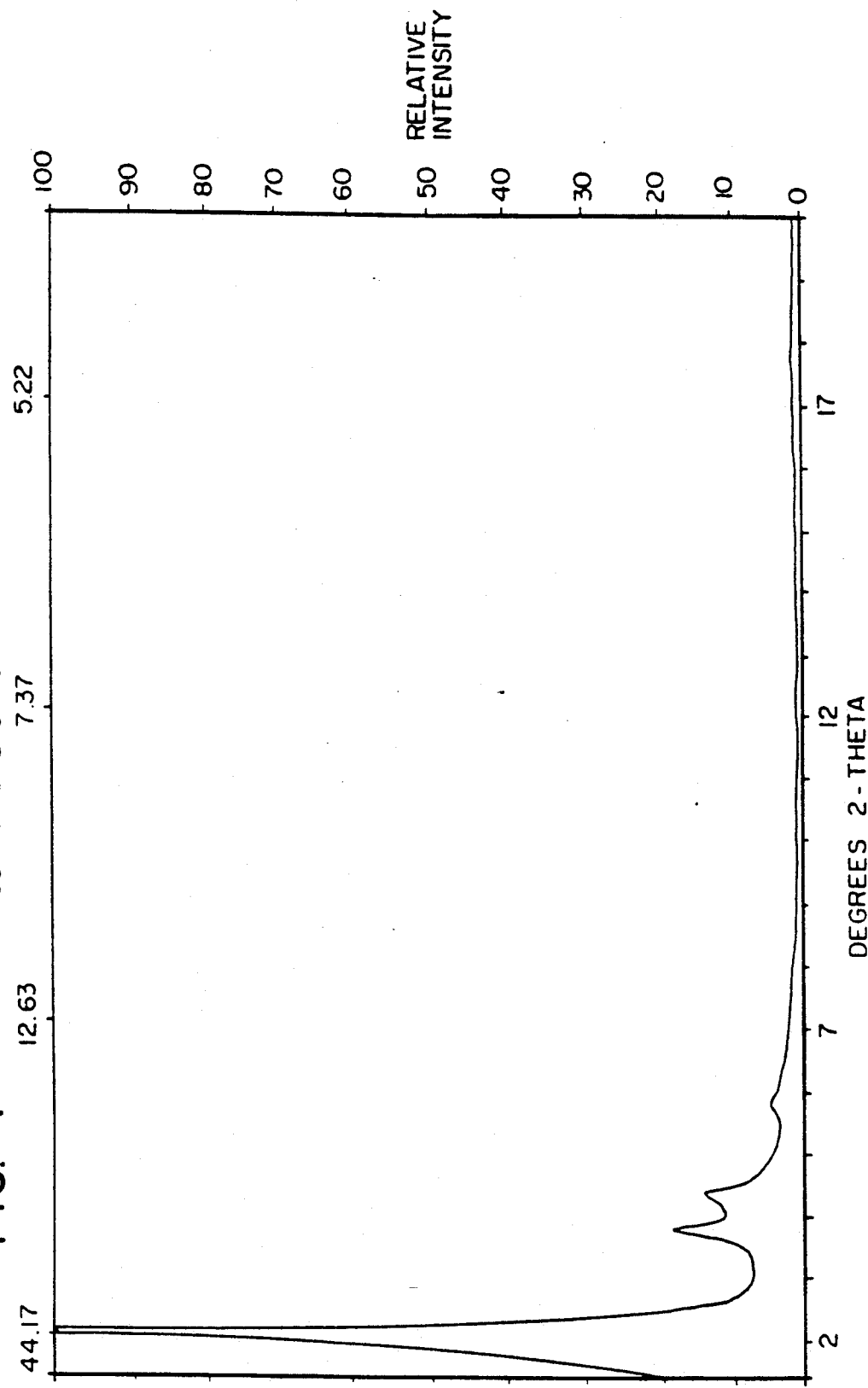

The X-ray diffraction pattern of the calcined product of this example is shown in FIG. 4. It may be characterized as including a very strong relative intensity line at 40.8±2.0 Angstroms d-spacing, and weak lines at 23.1±1.0 and 20.1±1.0 Angstroms. TEM indicated that the product contained the present ultra-large pore material (see Example 23).

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole $Al_2O_3$:
1.0 moles $P_2O_5$
0.51 moles $(Pyr)_2O$
47.2 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 707 m²/g and the following equilibrium adsorption capacities in grams/100 grams:

| | |
|---|---|
| $H_2O$ | 33.2 |
| Cyclohexane | 19.7 |
| n-Hexane | 20.1 |
| Benzene | 23.3 |

Figure 5:
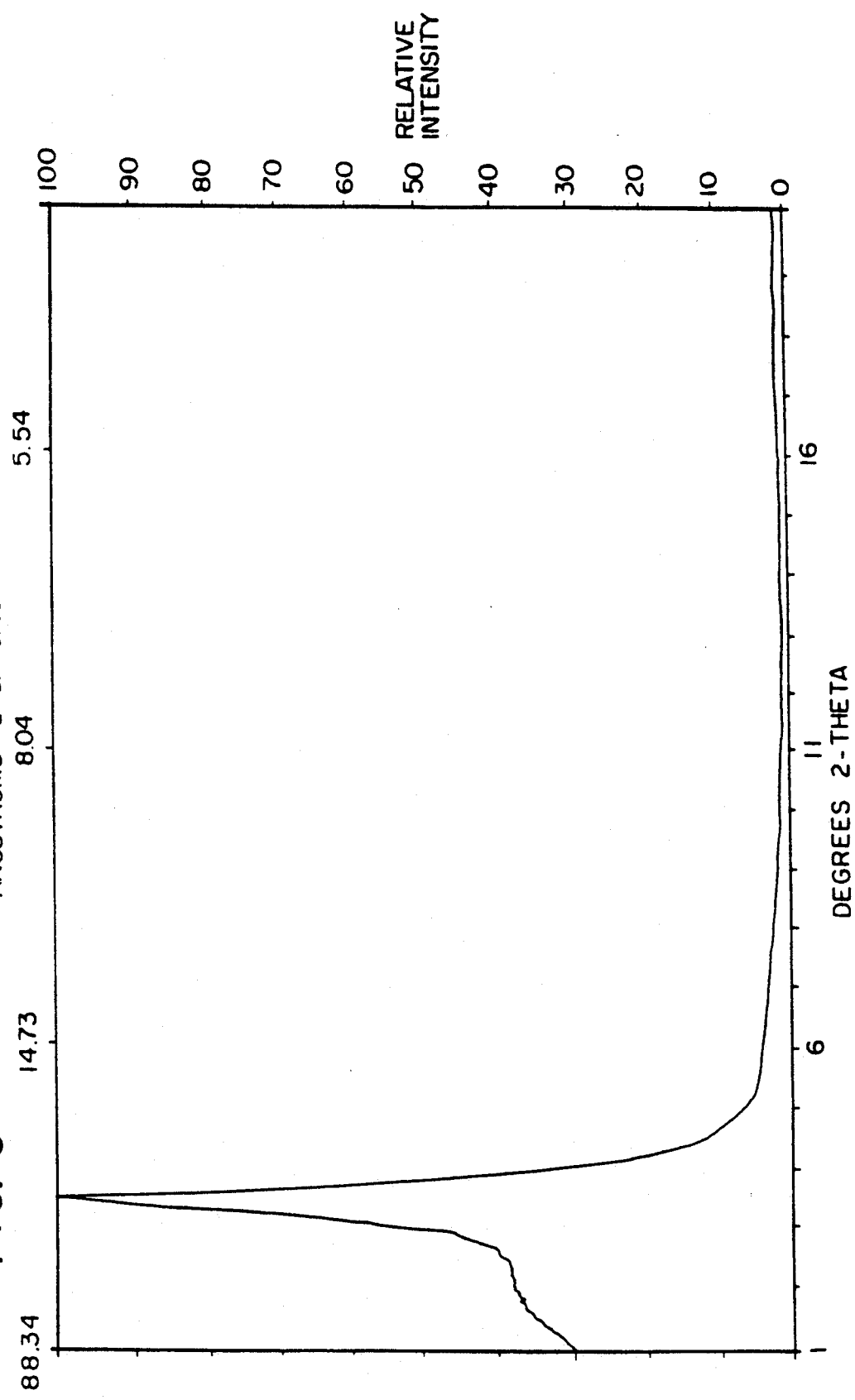

The X-ray diffraction pattern of the calcined product of this example is shown in FIG. 5. It may be characterized as including a very strong relative intensity line at 25.4±1.5 Angstroms d-spacing. TE indicated the product contained the present ultra-large pore material (see Example 23).

EXAMPLE 6

A solution of 1.35 grams of $NaAlO_2$ (43.5%, $Al_2O_3$, 30% $Na_2O$) dissolved in 45.2 grams of water was mixed with 17.3 grams of NaOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:
0.25 moles $Al_2O_3$
10 moles $Na_2O$
36 moles $SiO_2$
0.95 moles $(CTMA)_2O$
2.5 moles $(TEA)_2O$
445 moles $H_2O$ The resulting solid product was recovered by filtration and washed with water and ethanol. The product was then calcined at 540° C. for 1 hour in nitrogen, followed by 6 hours in air.

The calcined product composition included 0.14 wt. % Na, 68.5 wt. % $SiO_2$ and 5.1 wt. % $Al_2O_3$, and proved to have a benzene equilibrium adsorption capacity of 58.6 grams/100 grams.

Figure 6:
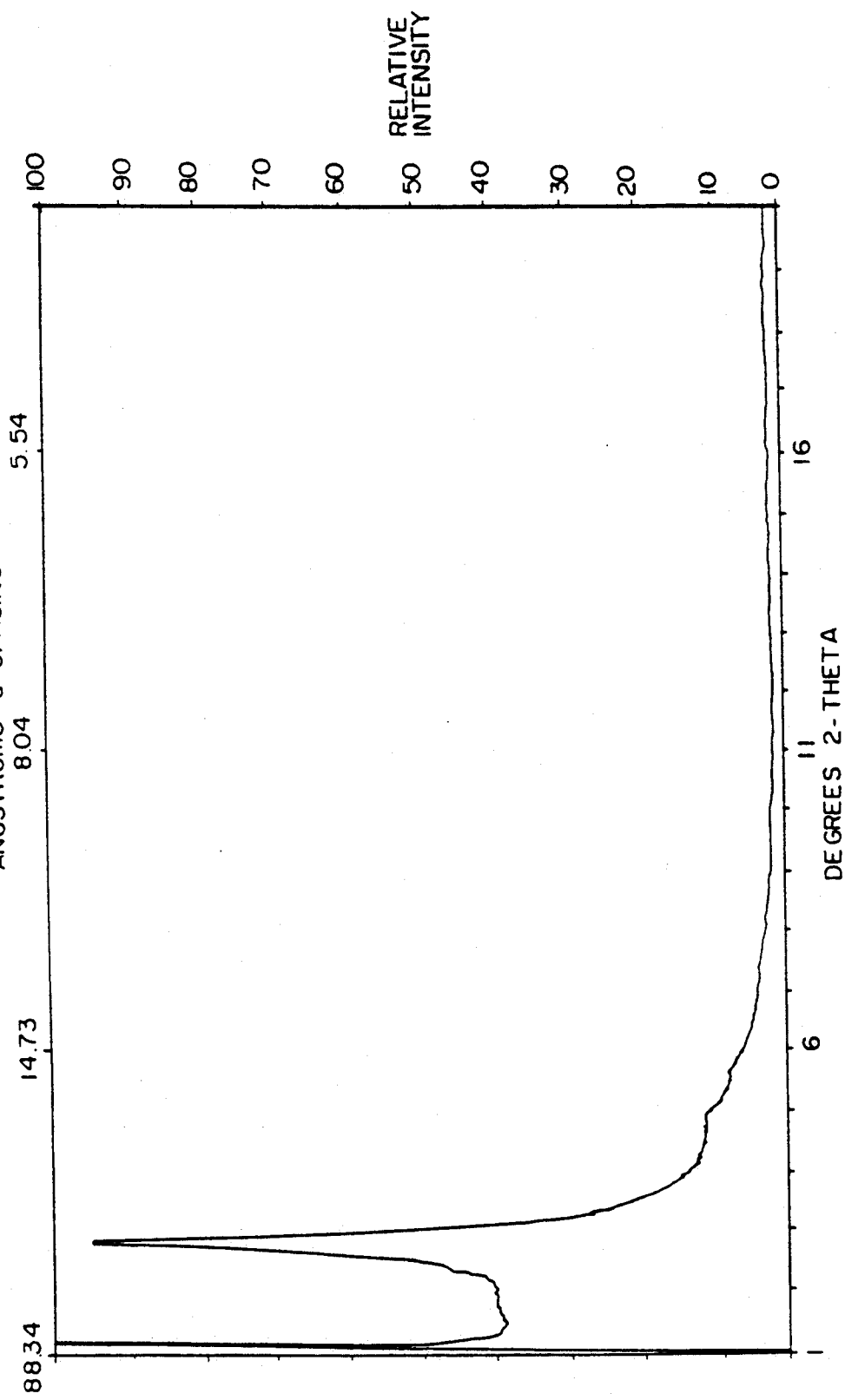

The X-ray diffraction pattern of the calcined product of this example is shown in FIG. 6. The product of this example may be characterized as including a very strong relative intensity line at 31.4±1.5 Angstroms d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C. for 48 hours with stirring at 200 rpm. The mixture has a composition in terms of moles per mole $SiO_2$:
0.5 mole $(CTMA)_2O$
46.5 moles $H_2O$ The resulting solid product was recovered by filtration, washed with water, then calcined at 540° C. for 1 hour in nitrogen, followed by 10 hours in air.

The calcined product composition included less than 0.01 wt. % Na, about 98.7 wt. % $SiO_2$ and about 0.01 wt. % $Al_2O_3$, and proved to have a surface area of 896 $m^2/g$. The calcined product had the following equilibrium adsorption capacities in grams/100 grams:

|  |  |
| --- | --- |
| $H_2O$ | 8.4 |
| Cyclohexane | 49.8 |
| n-Hexane | 42.3 |
| Benzene | 55.7 |

Figure 7:
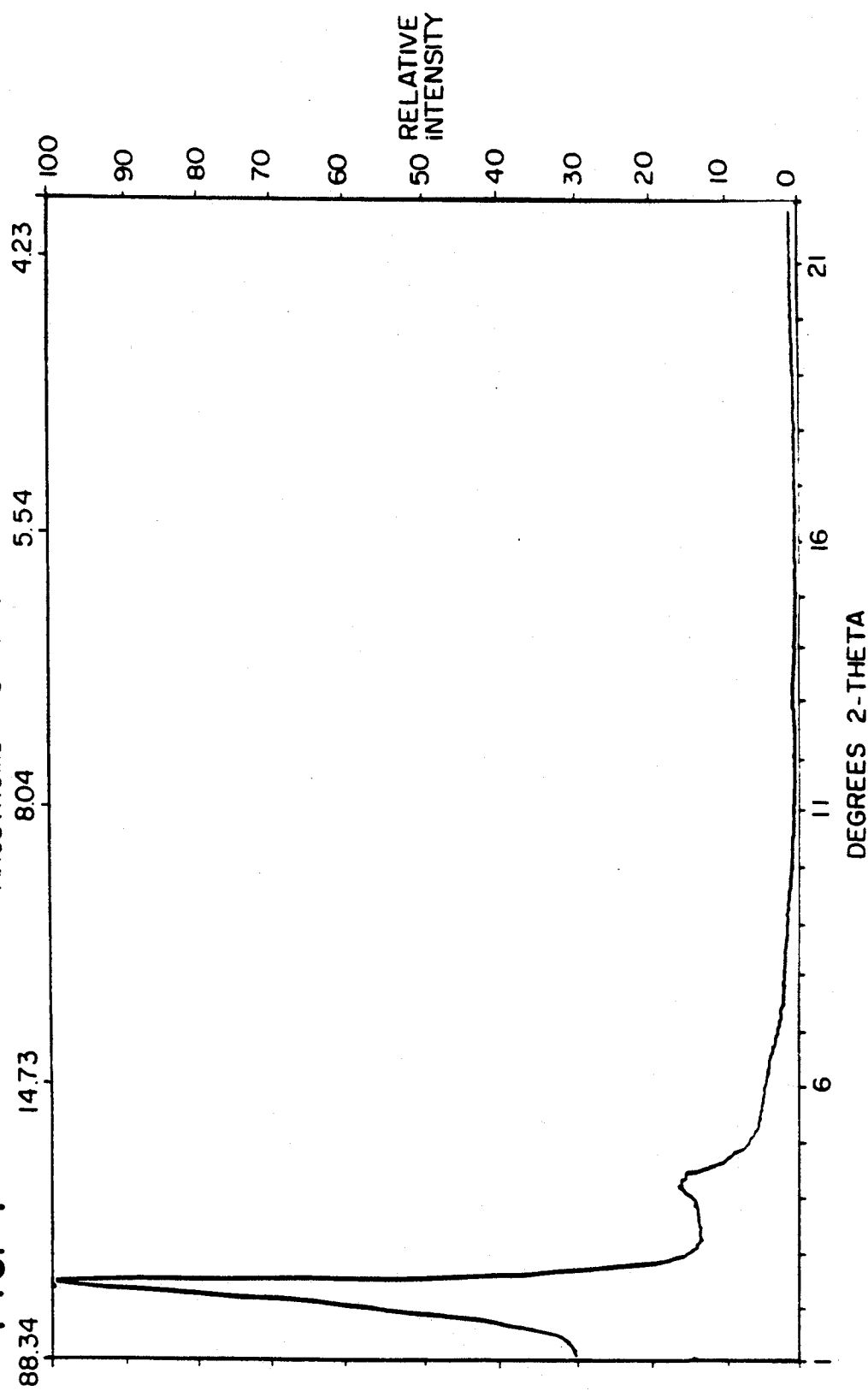

The X-ray diffraction pattern of the calcined product of this example is shown in FIG. 7. It may be characterized as including a very strong relative intensity line at 40.0±2.0 Angstroms d-spacing and a weak line at 21.2±1.0 Angstroms. TEM indicated that the product of this example contained at least three separate phases, one of which was the present ultra-large pore material.

EXAMPLE 8

A mixture of 150 grams of cetyltrimethylammonium (CTMA) hydroxide solution prepared as in Example 1 and 2; grams of colloidal silica (40%, Ludox HS-40) with an initial pH of 12.64 was heated in a 300 cc autoclave at 150° C. for 48 hours with stirring at 200 rpm. The mixture had a composition in terms of moles per mole $SiO_2$:
0.5 mole $(CTMA)_2O$
46.5 moles $H_2O$ The resulting solid product was recovered by filtration, washed with water, then calcined at 540° C. for 6 hours in air.

The calcined product composition was measured to include 0.01 wt. % Na, 93.2 wt. % $SiO_2$ and 0.016 wt. % $Al_2O_3$, and proved to have a surface area of 992 $m^2/g$ and the following equilibrium adsorption capacities in grams/100 grams:

|  |  |
| --- | --- |
| $H_2O$ | 4.6 |
| Cyclohexane | >50 |
| n-Hexane | >50 |
| Benzene | 62.7 |

Figure 8:
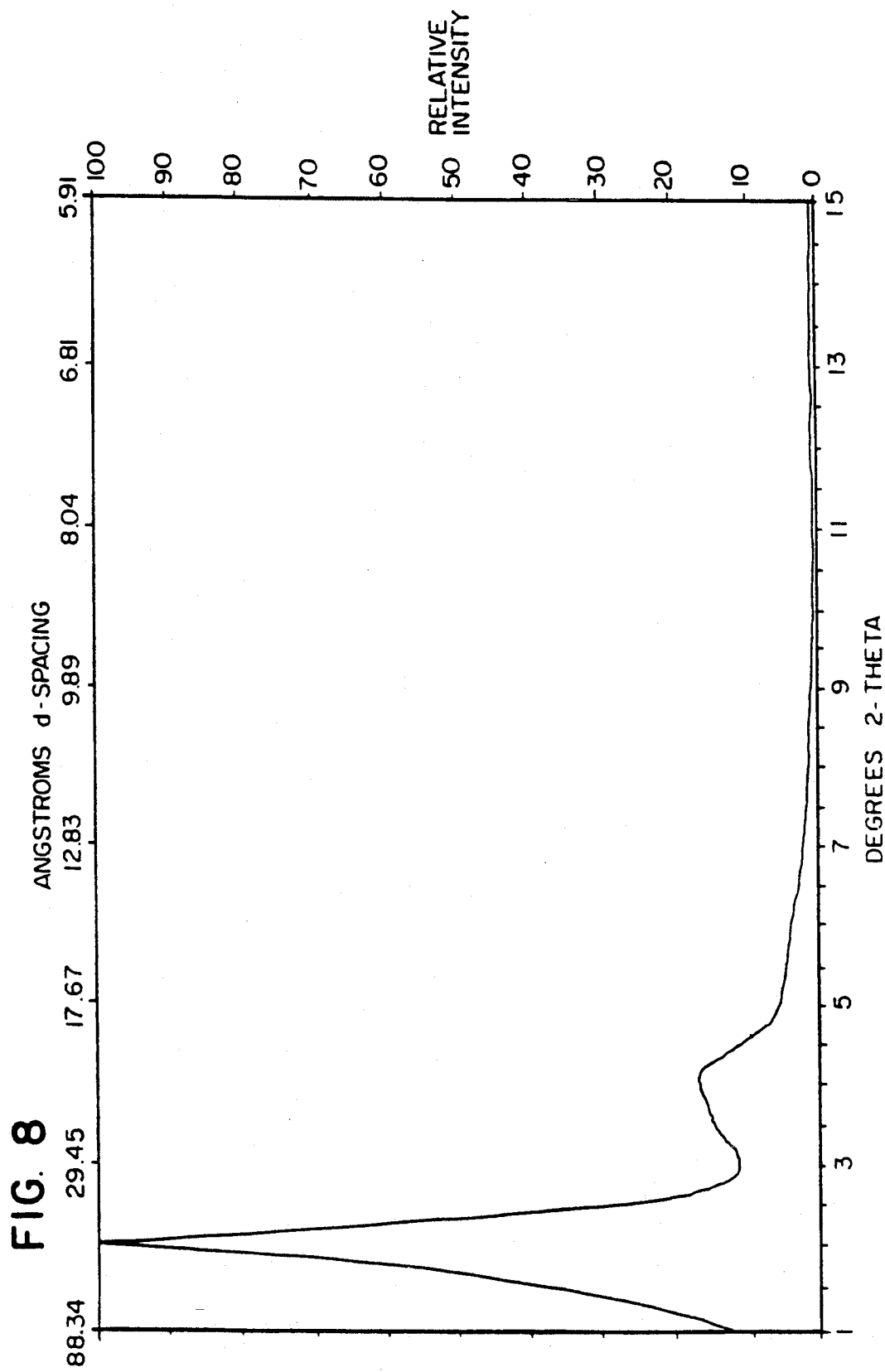

The X-ray diffraction pattern of the calcined product of this example is shown in FIG. 8. This product may be characterized as including a very strong relative intensity line at 43.6±2.0 Angstroms d-spacing and weak lines at 25.1±1.5 and 21.7±1.0 Angstroms. TEM indicated that the product contained the present ultra-large pore material.

EXAMPLE 9

Sodium aluminate (4.15 g) was added slowly into a solution containing 16 g of myristyltrimethylammonium bromide in $(C_{14}TMABr)$ in 100 g of water. Tetramethylammonium silicate (100 g-10% $SiO_2$), HiSil (25 g) and tetramethylammonium hydroxide (14.2 g-25% solution) were then added to the mixture. It was crystallized in an autoclave at 120° C. with stirring for 24 hours.

Figure 9:
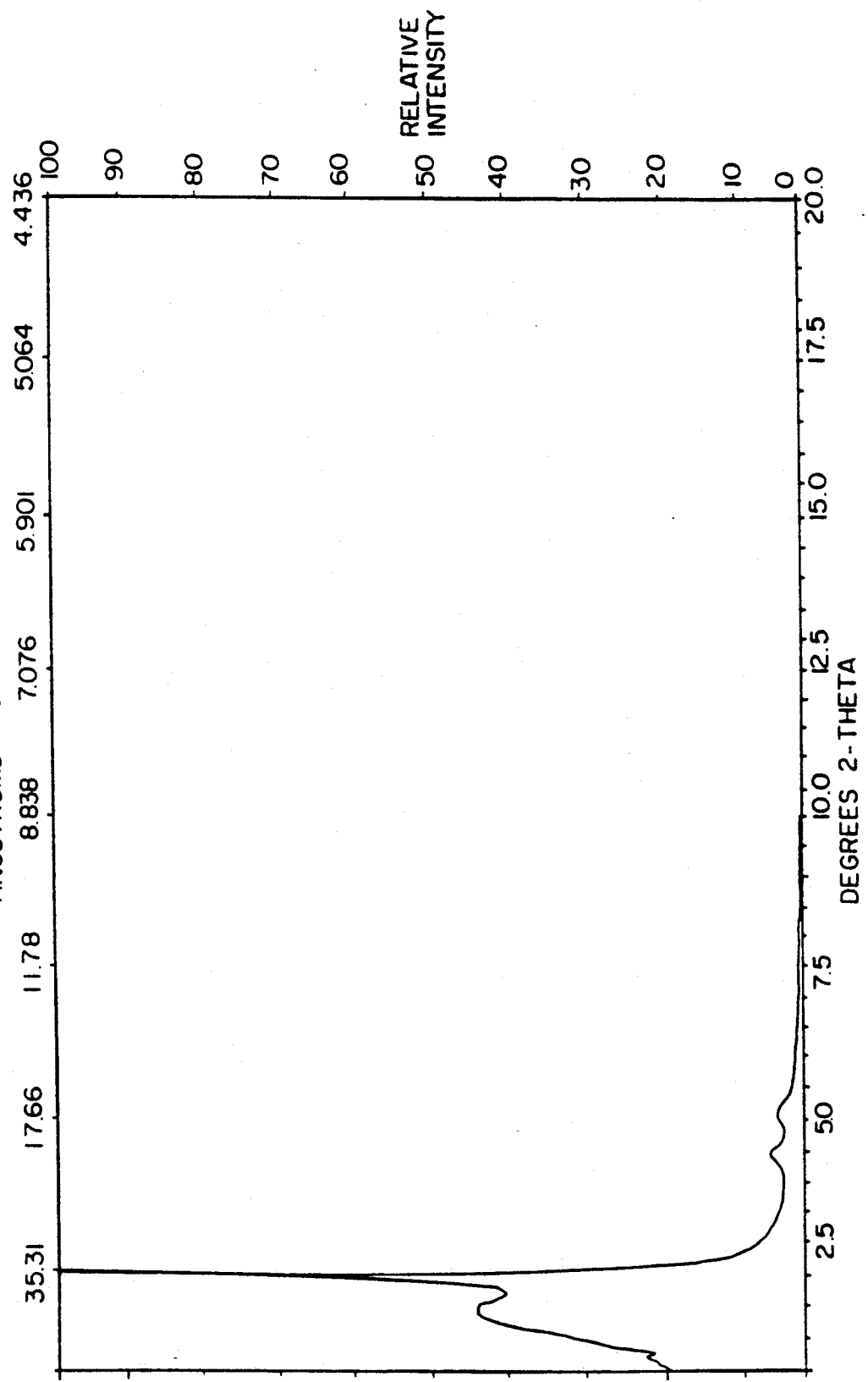

The product was filtered, washed and air dried. Elemental analysis showed the product contained 53.3 wt% $SiO_2$, 3.2 wt % $Al_2O_3$, 15.0 wt % C, 1.88 wt % N, 0.11 wt % Na and 53.5 wt % ash at 1000° C. FIG. 9 shows the X-ray diffraction pattern of the material having been calcined at 540° C. for 1 hour in $N_2$ and 6 hours in air. The X-ray diffraction pattern includes a very strong relative intensity line at 35.3±2.0 Angstroms d-spacing and weak lines at 20.4±1.0 and 17.7±1.0 Angstroms d-spacing. TEM indicated that the product contained the present ultra-large pore material.

The washed product, having been exchanged with 1N ammonium nitrate solution at room temperature, then calcined, proved to have a surface area of 827 $m^2/g$ and the following equilibrium adsorption capacities in g/100 g anhydrous sorbent:

|  |  |
| --- | --- |
| $H_2O$ | 30.8 |
| Cyclohexane | 33.0 |
| n-Hexane | 27.9 |
| Benzene | 40.7 |

EXAMPLE 10

Sodium aluminumate (8.3 g) was added slowly into a solution containing 184 g of dodecyltrimethylammonium hydroxide ($C_{12}$TMAOH, 50%) solution diluted with 480 g of water. UltraSil (50 g) and an aqueous solution of tetramethylammonium silicate (200 g-10% $SiO_2$) and tetramethylammonium hydroxide (26.38 g-25% solution) were then added to the mixture. It was crystallized in an autoclave at 100° C. with stirring for 24 hours.

Figure 10:
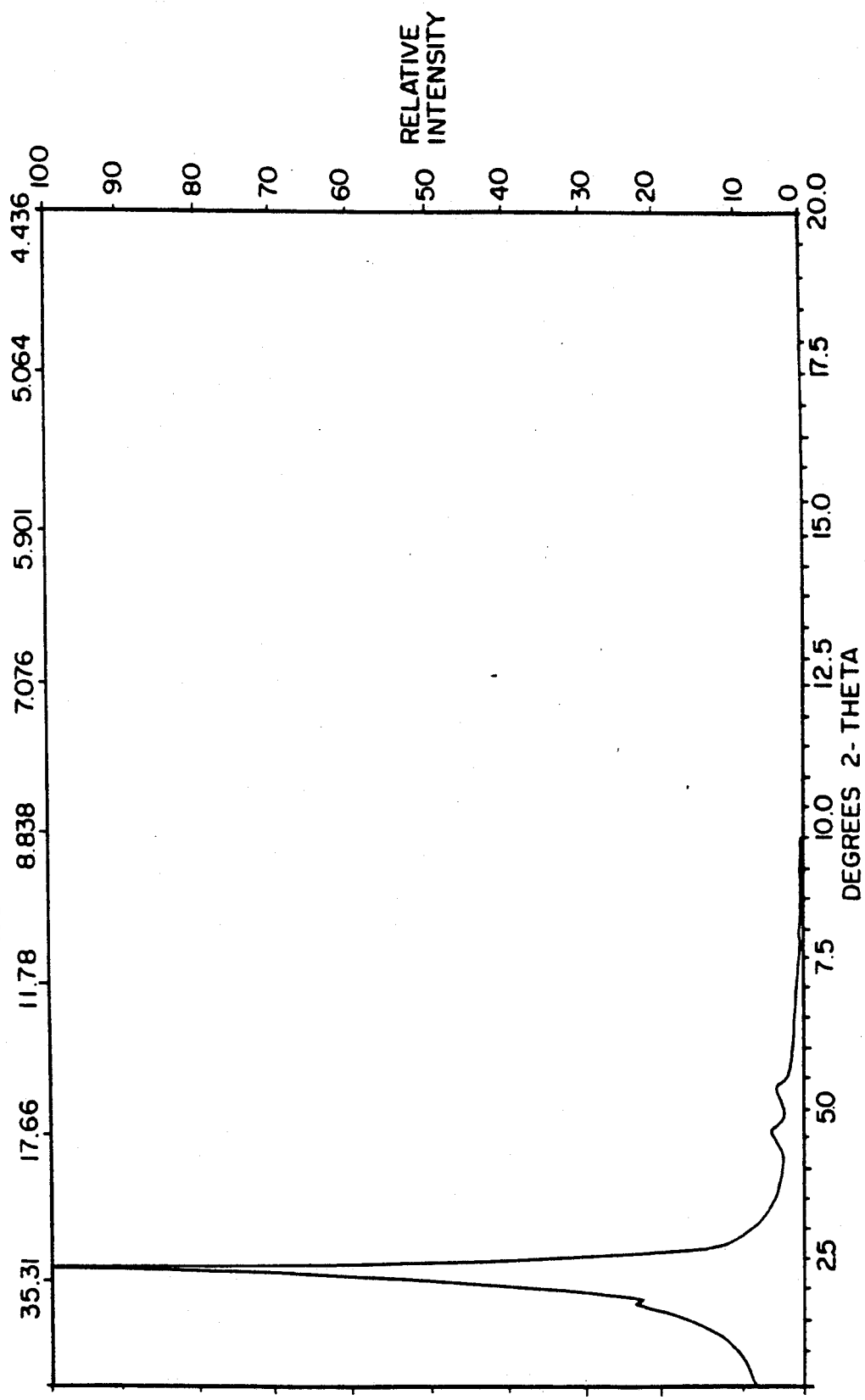

The product was filtered, washed and air dried. FIG. 10 shows the X-ray diffraction pattern of the material having been calcined at 540° C. for 1 hour in $N_2$ and 6 hours in air. The X-ray diffraction pattern includes a very strong relative intensity line at 30.4±1.5 Angstroms d-spacing and weak lines at 17.7±1.0 and 15.3±1.0 Angstroms d-spacing. TEM indicated that the product contained the present ultra-large pore material.

The washed product, having been exchanged with 1N ammonium nitrate solution at room temperature, then calcined, proved to have a surface area of 1078 $m^2/g$ and the following equilibrium adsorption capacities in g/100 g anhydrous sorbent:

| | |
|---|---|
| $H_2O$ | 32.6 |
| Cyclohexane | 38.1 |
| n-Hexane | 33.3 |
| Benzene | 42.9 |

EXAMPLE 11

A solution of 4.9 grams of $NaAlO_2$ (43.5% $Al_2O_3$, 30% $NaO_2$) in 37.5 grams of water was mixed with 46.3 cc of 40% aqueous tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole $Al_2O_3$:

1.1 moles $Na_2O$
30.6 moles $SiO_2$
3.0 moles $(TEA)_2O$
3.25 moles $(CTMA)_2O$
609 moles $H_2O$ The resulting solid product was recovered by filtration, washed with water then calcined at 540° C. for 16 hours in air.

The calcined product had a surface area of 1352 $m^2/g$ and the following equilibrium adsorption capacities in grams/100 grams:

| | |
|---|---|
| $H_2O$ | 23.6 |
| Cyclohexane | >50 |
| n-Hexane | 49 |
| Benzene | 67.5 |

Figure 11:
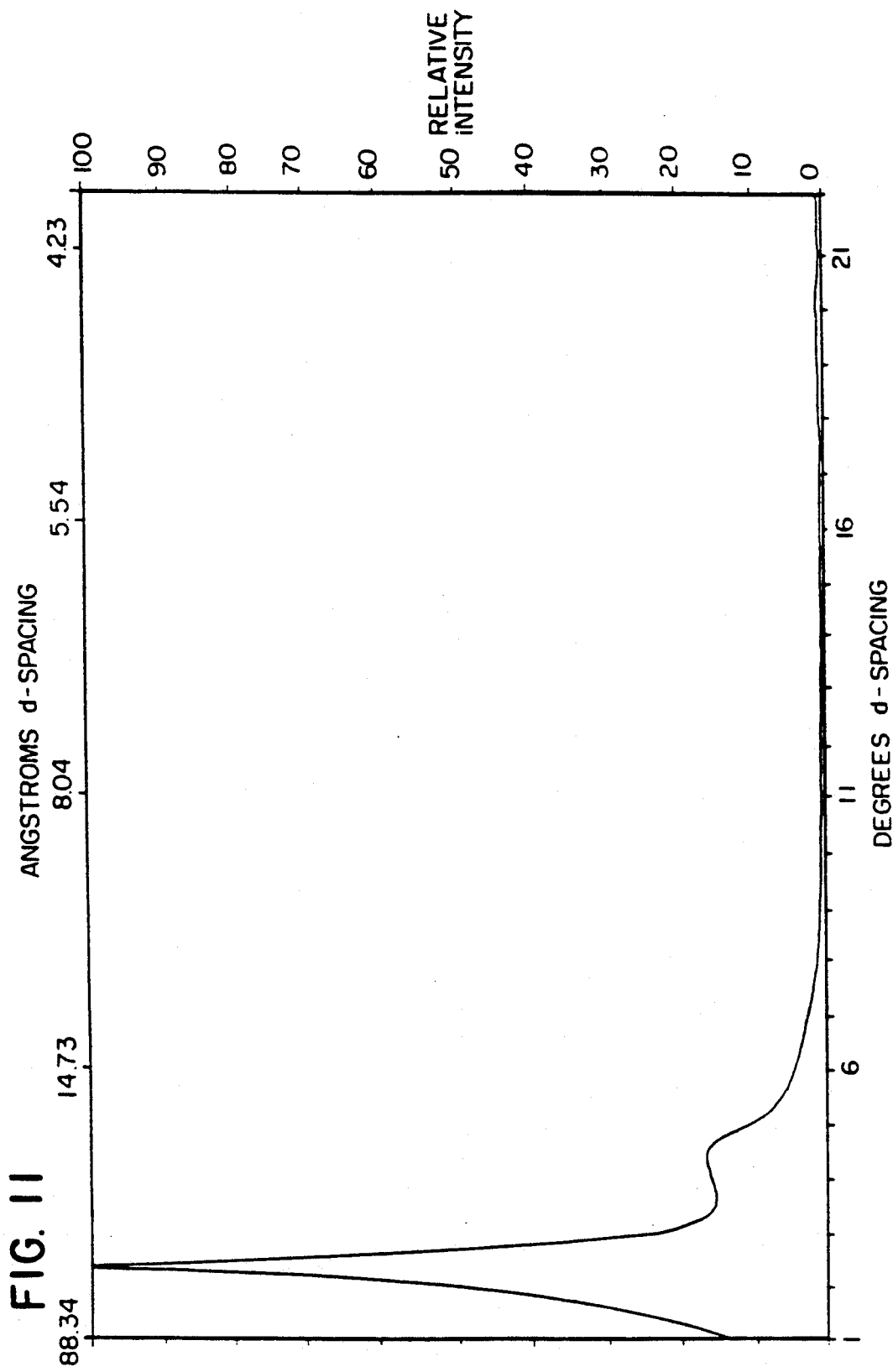

The X-ray diffraction pattern of the calcined product of this example is shown in FIG. 11. The product had a very strong relative intensity line at 38.5±2.0 Angstroms d-spacing and a weak line at 20.3±1.0 Angstroms. TEM indicated that the product contained the present ultra-large pore material.

EXAMPLE 12

Figure 12:
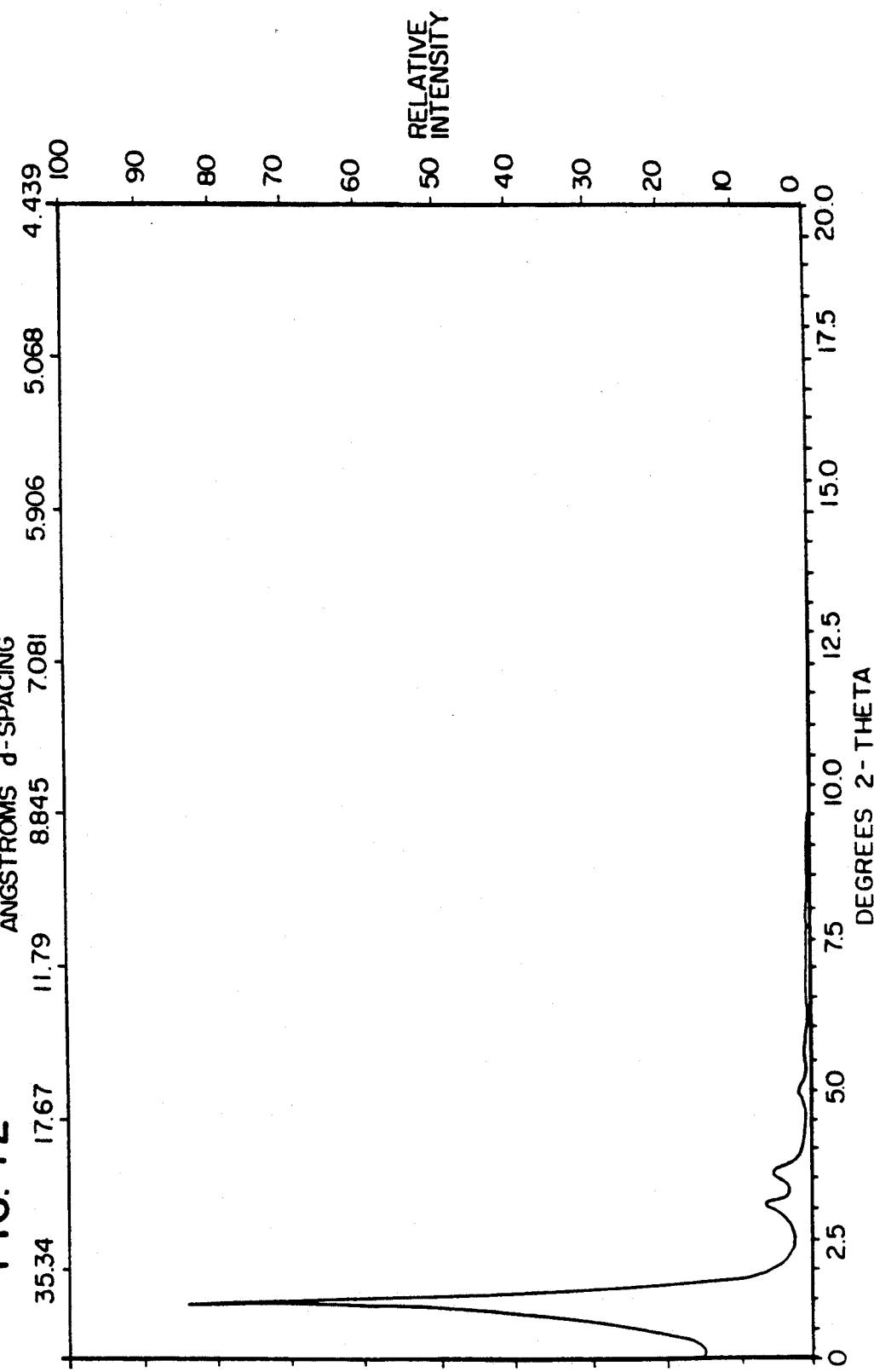

Two hundred grams of cetyltrimethylammonium (CTMA) hydroxide solution prepared as in Example 1 Was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole $Al_2O_3$:

1.25 moles $Na_2O$
27.8 moles $SiO_2$
5.1 moles $(CTMA)_2O$
4.40 moles $(TMA)_2O$
650 moles $H_2O$ The resulting solid product was recovered by filtration and dried in air at ambient temperature. The product was then calcined at 540° C. for 1 hour in nitrogen, followed by 6 hours in air. TEM indicated that this product contained the present ultra-large pore material. The X-ray diffraction pattern of the calcined product of this example is shown in FIG. 12. This pattern can be characterized as including a very strong relative intensity line at 44.2±2.0 Angstroms d-spacing and weak lines at 25.2±1.5 and 22.0±1.0 Angstroms.

The calcined product proved to have a surface area of 932 $m^2/g$ and the following equilibrium adsorption capacities in grams/100 grams:

| | |
|---|---|
| $H_2O$ | 39.3 |
| Cyclohexane | 46.6 |
| n-Hexane | 37.5 |
| Benzene | 50 |

The product was then ammonium exchanged with 1N $NH_4NO_3$ solution, then calcined at 540° C. for 10 hours in air.

EXAMPLE 13

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a steam box at 100° C. for 48 hours. The mixture had a composition in terms of moles per mole $Al_2O_3$:

1.25 moles $Na_2O$
27.8 moles $SiO_2$
5.1 moles $(CTMA)_2O$
4.4 moles $(TMA)_2O$
650 moles $H_2O$ The resulting solid was recovered by filtration, dried in air at ambient temperature, then calcined at 540° C. for 1 hour in nitrogen, followed by 6 hours in air. The calcined product had the following equilibrium adsorption capacities in g/100 g:

| | |
|---|---|
| H₂O | 35.2 |
| Cyclohexane | >50 |
| n-Hexane | 40.8 |
| Benzene | 53.5 |

Figure 13:
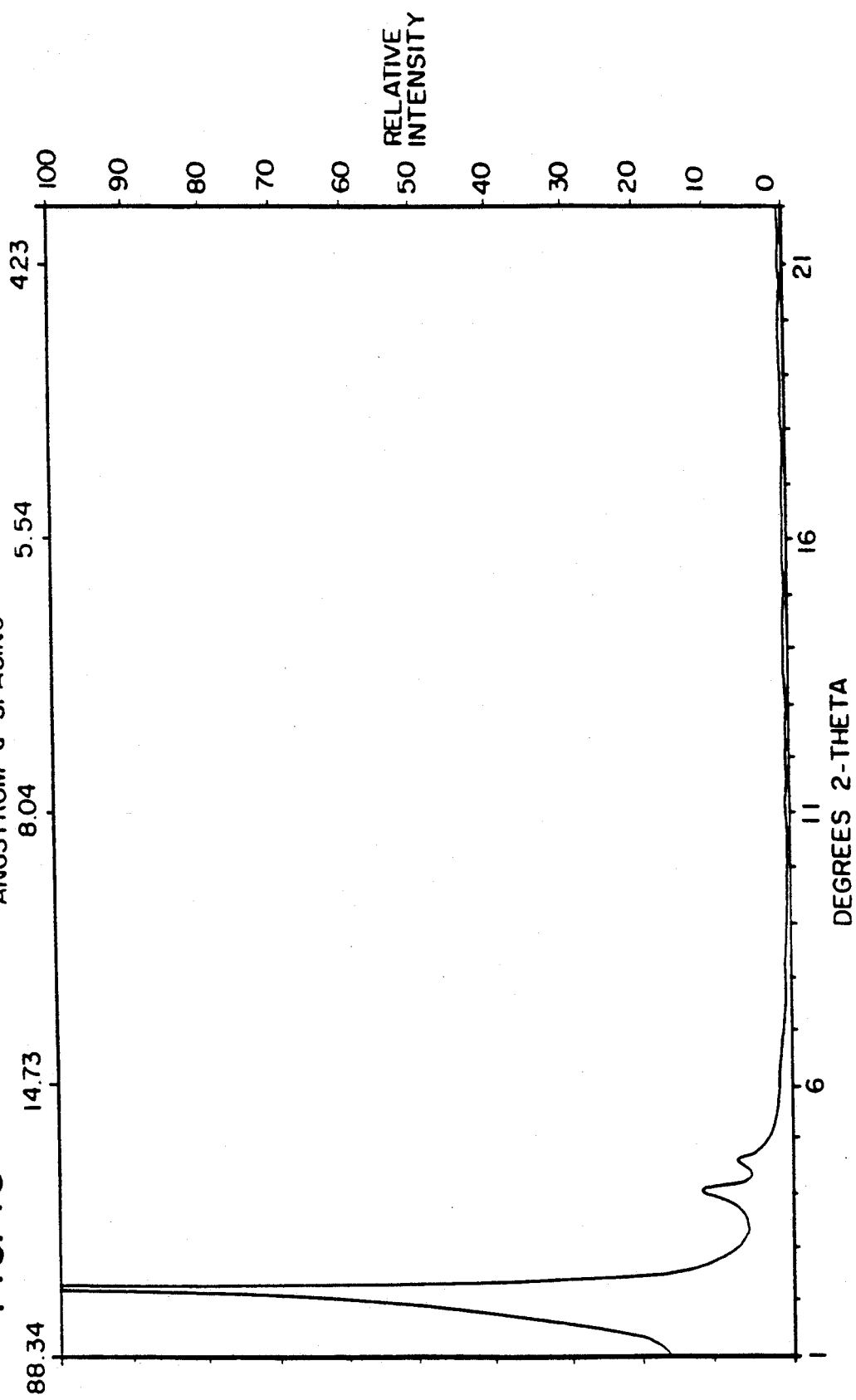

The X-ray diffraction pattern of the calcined product of this example is shown in FIG. 13. This product may be characterized as including a very strong relative intensity line at 39.1±2.0 Angstroms d-spacing and weak lines at 22.4±1.0 and 19.4±1.0 Angstroms. TEM indicated that this product contained the present ultra-large pore material.

The product was then ammonium exchanged with 1N $NH_4NO_3$ solution, then calcined at 540° C. for 10 hours in air.

EXAMPLE 14

A mixture of 125 grams of 29% CTMA chloride aqueous solution, 200 grams of water, 3 grams of sodium aluminate (in 50 grams $H_2O$), 65 grams of Ultrasil, amorphous precipitated silica available from PQ Corporation, and 21 grams NaOH (in 50 grams $H_2O$) was stirred thoroughly crystallized at 150° C. for 168 hours. The reaction mixture had the following relative molar composition in terms of moles per mole silica:

0.10 moles $(CTMA)_2O$
21.89 moles $H_2O$
0.036 moles $NaAlO_2$
0.53 moles NaOH

The solid product was isolated by filtration, washed with water, dried for 16 hours at room temperature and calcined at 540° C. for 10 hours in air. The calcined product had a surface area of 840 m²/g, and the following equilibrium adsorption capacities in grams/100 grams:

| | |
|---|---|
| H₂O | 15.2 |
| Cyclohexane | 42.0 |
| n-Hexane | 26.5 |
| Benzene | 62 |

Figure 14:
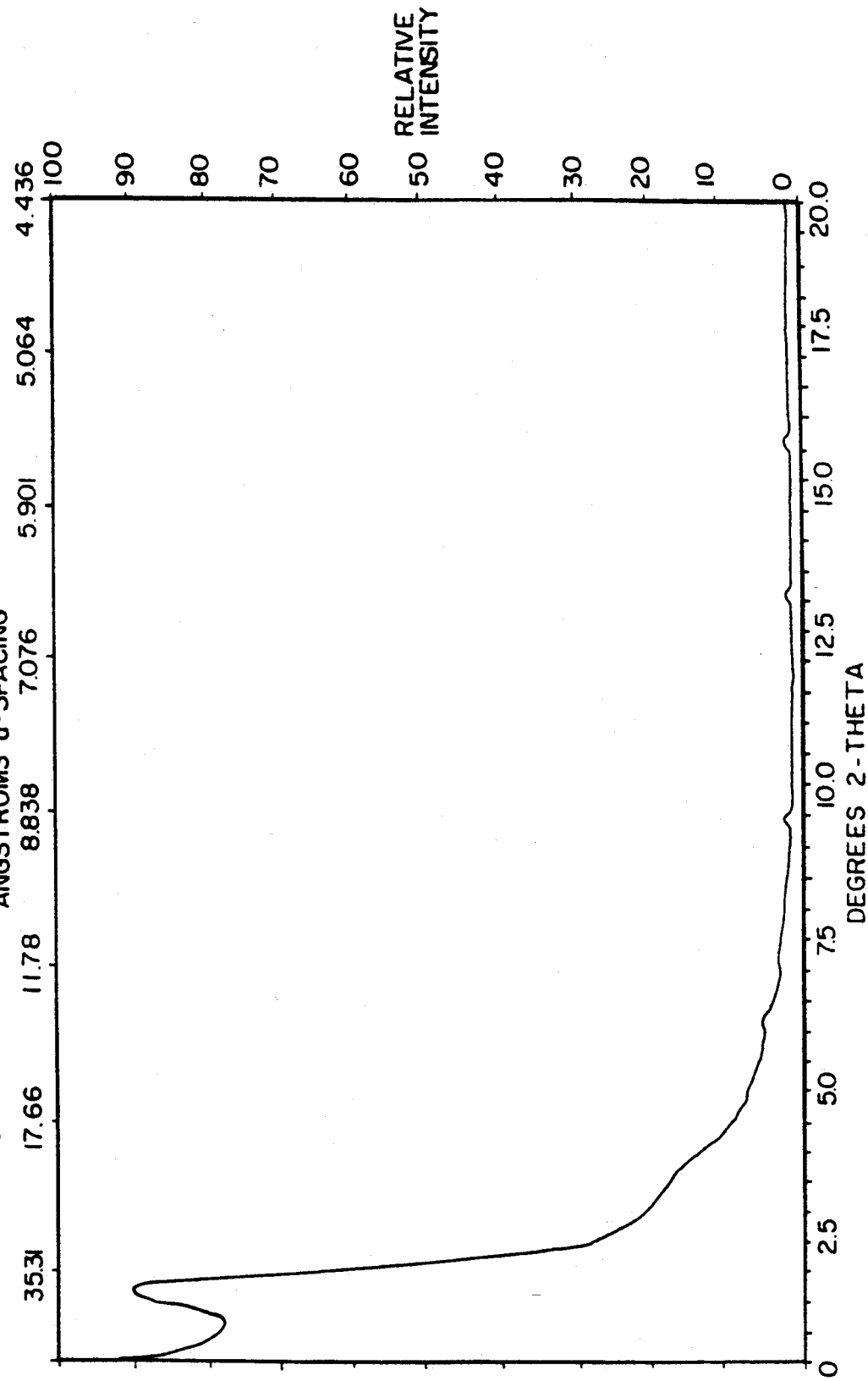

The X-ray diffraction pattern of the calcined product of this Example, shown in FIG. 14, may be characterized as including a very strong relative intensity line at 40.5±2.0 Angstroms d-spacing. TEM indicated that the product contained the present ultra-large pore material.

EXAMPLE 15

For comparison purposes, a commercially prepared ultra-stable zeolite Y was obtained. It had a benzene equilibrium adsorption capacity of 20.7 grams/100 grams. Its X-ray diffraction pattern had all the lines of zeolite Y with its highest value peak at about 14.0 Angstroms d-spacing.

EXAMPLE 16

To make the primary template mixture for this example, 240 grams of water was added to a 92 gram solution of 50% dodecyltrimethylammonium hydroxide, 36% isopropyl alcohol and 14% water such that the mole ratio of Solvent/$R_2/O$ was 155. The mole ratio of $H_2O/R_2/O$ in this mixture was 149 and the IPA/$R_2/O$ mole ratio was 6. To the primary template mixture was added 4.15 grams of sodium aluminate, 25 grams of HiSil, 100 grams of aqueous tetramethylammonium silicate solution (10% $SiO_2$) and 13.2 grams of 25% aqueous tetramethylammonium hydroxide solution.

The mole ratio of $R_2/O/(SiO_2+Al_2O_3)$ was 0.28 for the mixture.

This mixture was stirred at 25° C. for 1 hour, then placed in an autoclave at 100° C. and stirred at 100 rpm for 24 hours. The mixture in the autoclave had the following relative molar composition in terms of moles per mole $SiO_2$:

0.05 mole $Na_2O$
0.036 mole $Al_2O_3$
0.18 mole $(C_{12}TMA)_2O$
0.12 mole $(TMA)_2O$
36.0 mole $H_2O$
1.0 mole IPA The resulting solid product was recovered by filtration, washed with water and dried in air at ambient temperature. The product was calcined at 540° C. for 1 hour in nitrogen, followed by 6 hours in air. It had a surface area of 1223 m²/g and the following equilibrium adsorption capacities in grams/100 grams:

| | |
|---|---|
| H₂O | 25.5 |
| Cyclohexane | 41.1 |
| n-Hexane | 35.1 |
| Benzene | 51 |

Figure 15:
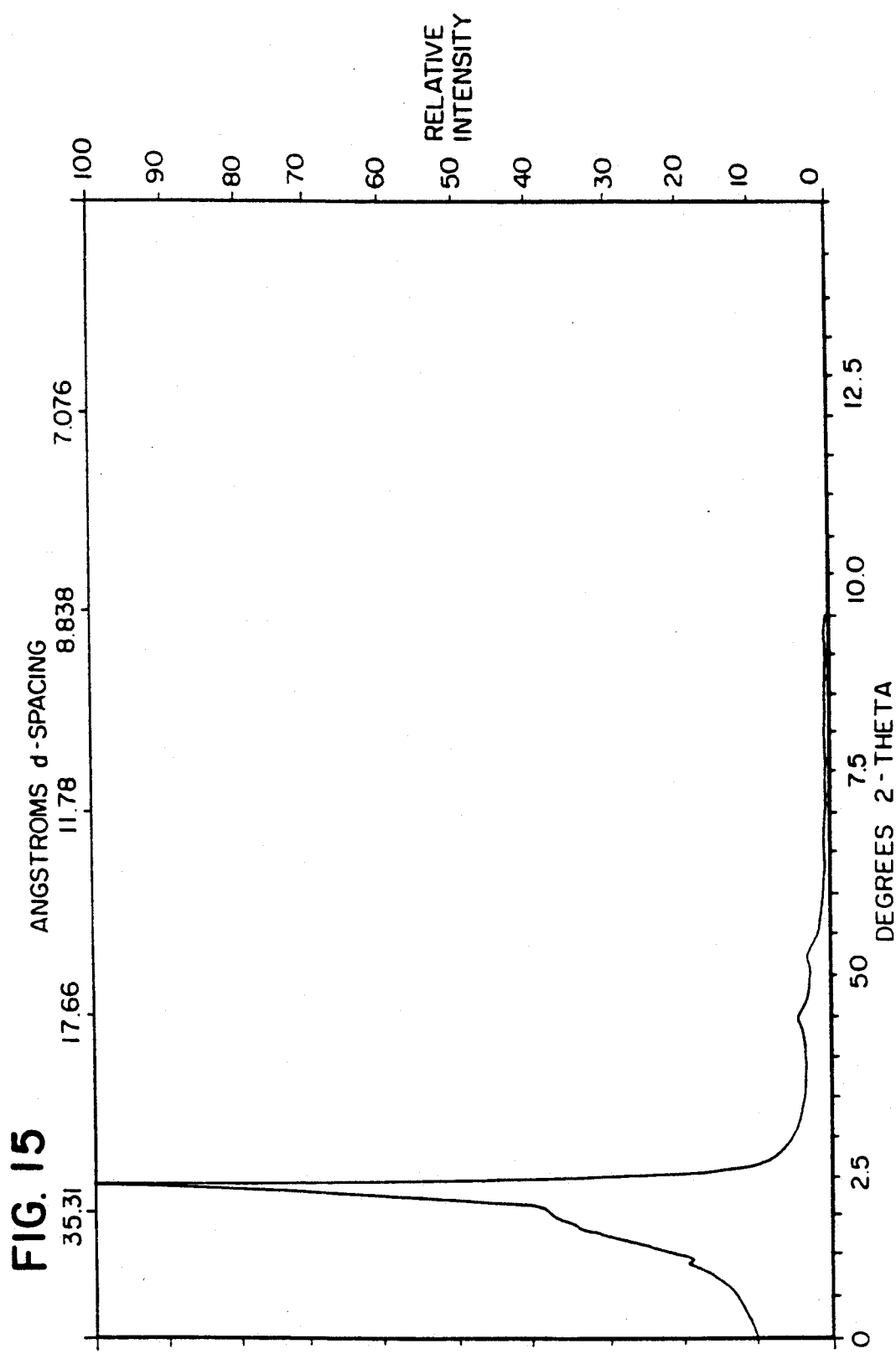

The X-ray diffraction pattern of the calcined product of this example is shown in FIG. 15. This product may be characterized as including a very strong relative intensity line at 30.8±1.5 Angstroms d-spacing and weak lines at 17.9±1.0 and 15.5±1.0 Angstroms. TEM indicated this product to contain the present ultra-large pore material.

EXAMPLE 17

A 50.75 gram quantity of decyltrimethylammonium hydroxide (prepared by contacting a ca. 29 wt. % solution of decyltrimethylammonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The composition in terms of moles per mole $SiO_2$ was:

0.81 mole $(C_{10}TMA)_2O$
47.6 moles $H_2O$

The resulting solid product was filtered and washed several times with warm (60°-70° C.) distilled water and with acetone. The final product was calcined to 538° C. in $N_2$/air mixture and then held in air for about 8 hours.

The calcined product proved to have a surface area of 915 m²/g and an equilibrium benzene adsorption capacity of 35 grams/100 grams. Argon physisorption data indicated an argon uptake of 0.34 cc/gram, and a pore size of 15 Angstroms.

The X-ray diffraction pattern of the calcined product of this example may be characterized as including a very strong relative intensity line at 27.5±1.5 Angstroms d-spacing and weak lines at 15.8±1.0 and 13.7±1.0 Angstroms. TEM indicated that the product of this example contained the present ultra-large pore material.

EXAMPLE 18

To eighty grams of cetyltrimethylammonium hydroxide (CTMAOH) solution prepared as in Example 1 was added 1.65 grams of $NaAlO_2$. The mixture was stirred at room temperature until the NaAlO$_2$ was dissolved. To this solution was added 40 grams of aqueous tetramethylammonium (TMA) silicate solution (10 wt. % SiO$_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm. The mixture had a composition in terms of moles per mole Al$_2$O$_3$:
1.25 moles Na$_2$O
27.8 moles SiO$_2$
5.1 moles (CTMA)$_2$O
2.24 moles (TMA)$_2$O
2256 moles H$_2$O
80.53 moles 1,3,5-trimethylbenzene The resulting product was filtered and washed several times with warm (60°–70° C.) distilled water and with acetone. The final product was calcined to 538° C. in N$_2$/air mixture and then held in air for about 10 hours. The calcined product had an equilibrium benzene adsorption capacity of >25 grams/100 grams.

The X-ray diffraction pattern of the calcined product of this example may be characterized as including a broad, very strong relative intensity line at about 102 Angstroms d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different d$_{100}$ values as observed in their electron diffraction patterns. These materials were found to possess d$_{100}$ values between about 85 Angstroms d-spacing and about 120 Angstroms d-spacing.

EXAMPLE 19

To eighty grams of cetyltrimethylammonium hydroxide (CTMAOH) solution prepared as in Example 1 was added 1.65 grams of NaAlO$_2$. The mixture was stirred at room temperature until the NaAlO$_2$ was dissolved. To this solution was added 40 grams of aqueous tetramethylammonium (TMA) silicate solution (10 wt. % SiO$_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole Al$_2$O$_3$:
1.25 moles Na$_2$O
27.8 moles SiO$_2$
5.1 moles (CTMA)$_2$O
2.24 moles (TMA)$_2$O
2256 moles H$_2$O
132.7 moles 1,3,5-trimethylbenzene The resulting product was filtered and washed several times with warm (60°–70° C.) distilled water and with acetone. The final product was calcined to 538° C. in N$_2$/air mixture and then held in air for about 10 hours.

The calcined product proved to have a surface area of 915 m$^2$/g and an equilibrium benzene adsorption capacity of >25 grams/100 grams. Argon physisorption data indicated an argon uptake of 0.95 cc/gram, and a pore size centered on 78 Angstroms (Dollimore-Heal Method, see Example 22(b)), but running from 70 to greater than 105 Angstroms.

The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product of this example contained several materials with different d$_{100}$ values as observed in their electron diffraction patterns. These materials had d$_{100}$ values between about 85 Angstroms d-spacing and about 110 Angstroms d-spacing.

EXAMPLE 20

To eighty grams of cetyltrimethylammonium hydroxide (CTMAOH) solution prepared as in Example 1 was added 1.65 grams of NaAlO$_2$. The mixture was stirred at room temperature until the NaAlO$_2$ was dissolved. To this solution was added 40 grams of aqueous tetramethylammonium (TMA) silicate solution (10 wt. % SiO$_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole Al$_2$O$_3$:
1.25 moles Na$_2$O
27.8 moles SiO$_2$
5.1 moles (CTMA)$_2$O
2.24 moles (TMA)$_2$O
650 moles H$_2$O
19.9 moles 1,3,5-trimethylbenzene The resulting product was filtered and washed several times with warm (60°–70° C.) distilled water and with acetone. The final product was calcined to 538° C. in N$_2$/air mixture and then held in air for about 8 hours. The calcined product had a surface area of 975 m$^2$/g and an equilibrium benzene adsorption capacity of >40 grams/100 grams. Argon physisorption data indicated an argon uptake of 0.97 cc/gram, and a pore size of 63 Angstroms (Dollimore-Heal Method, see Example 22(b)), with the peak occurring at $P/P_o=0.65$.

The X-ray diffraction pattern of the calcined product of this example may be characterized as including a very strong relative intensity line at 63±5 Angstroms d-spacing and weak lines at 36.4±2.0, 31.3±1.5 Angstroms and 23.8±1.0 Angstroms d-spacing. TEM indicated that the product of this example contained the present ultra-large pore material.

EXAMPLE 21

Argon Physisorption For Pore Systems Up to About 60 Angstroms Diameter

To determine the pore diameters of the products of this invention with pores up to about 60 Angstroms in diameter, 0.2 gram samples of the products of Examples 1 through 17 were placed in glass sample tubes and attached to a physisorption apparatus as described in U.S. Pat. No. 4,762,010, which is incorporated herein by reference.

Figure 16:
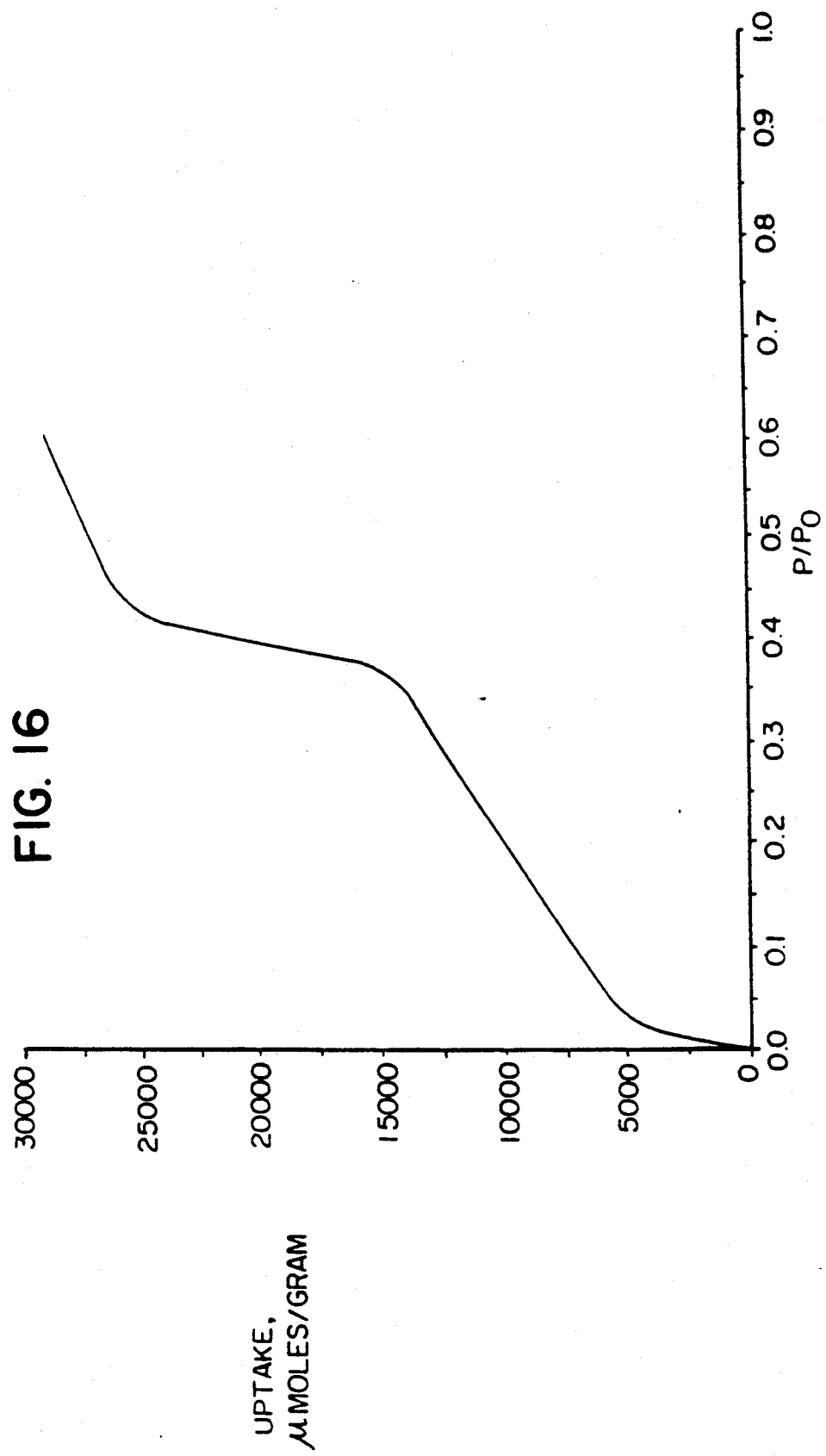
FIG. 16 is an isotherm plot of physisorption measurements from Example 22.

The samples were heated to 300° C. for 3 hours in vacuo to remove absorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon absorbed can be calculated. For this calculation, the ideal gas law and the calibrated sample volumes were used. (See also S. J. Gregg et al., *Adsorption, Surface Area and Porosity*, 2nd ed., Academic Press, 1982). In each instance, a graph of the amount absorbed versus the relative pressure above the sample, at equilibrium, constitutes the adsorption isotherm as shown in FIG. 16 for the Example 4 product sample. It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

Figure 17:
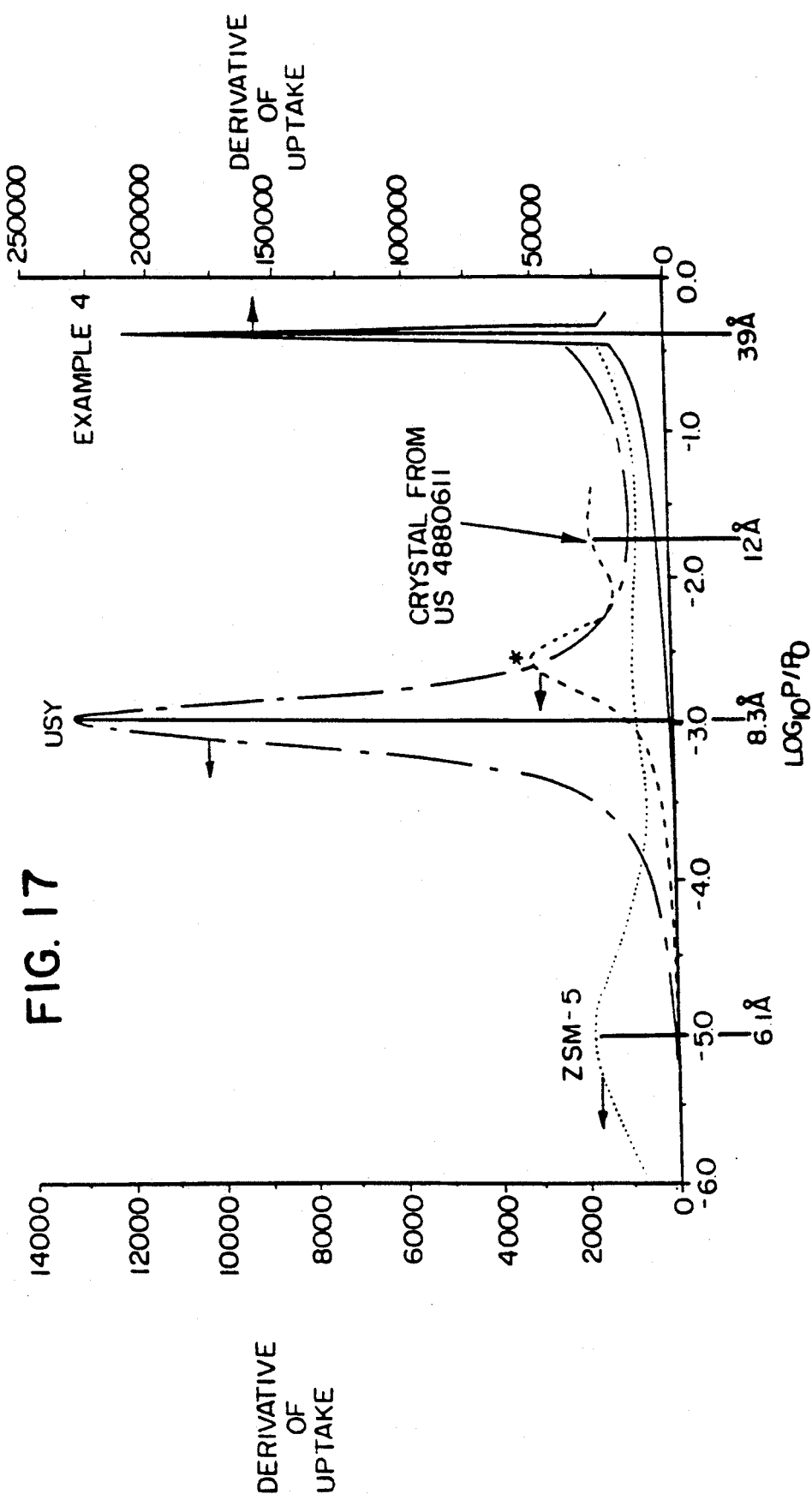
FIG. 17 is a plot of physisorption measurements from Example 22 showing pore sizes of various crystalline materials.

The step (inflection) in the isotherm, in this case (Example 4 product) at about $P/P_o=0.4$, indicates filling of a pore system. The size of the step indicates the amount absorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. This is shown in FIG. 17. Also shown in FIG. 17 are data obtained in an identical fashion for a crystalline material from U.S. Pat. No. 4,880,611 and several other crystal materials. There is further provided a physical scale on the axis which converts the position of an adsorption peak in terms of log $(P/P_o)$ to the physical pore diameter in Angstroms. This conversion was obtained by using the following formula:

$$\log(P/P_o) = \frac{K}{d - 0.38} \left( \frac{S^4}{3(L - D/2)^3} - \frac{S^{10}}{9(L - D/2)^9} - \frac{S^4}{3(D/2)^3} + \frac{S^{10}}{9(D/2)^9} \right)$$

wherein d=pore diameter in nanometers, K=32.17, S=0.2446, L =d+0.19, and D=0.57.

This formula is derived from the method of Horvath and Kawazoe (G. Horvath et al., *J. Chem. Eng. Japan*, 16 (6) 470(1983)). The constants required for the implementation of this formula were determined from a measured isotherm of ALPO-5 and its known pore size. This method is particularly useful for microporous materials having pores of up to about 60 Angstroms in diameter.

As is indicated in FIG. 17, the pore size of the material of Example 4 is 39.6 Angstroms with the peak occurring at log $(P/P_o)=-0.4$ or $P/P_o=0.4$, while the pore size of the material from U.S. Pat. No. 4,880,611 is 12 Angstroms or $P/P_o=0.02$. In the other materials, a peak is observed at $P/P_o=0.015$ which is denoted by an asterisk in FIG. 17. This peak reflects adsorption on the walls of the pores and is not otherwise indicative of the size of the pores of a given material. A value of $P/P_o$ of 0.03 corresponds to 13 Angstroms pore size.

The results of this procedure for the samples from Examples 1 through 17 are tabulated below. The samples from Examples 10, 13 and 16 gave two separate peaks, believed to be the result of two separate ultra-large pore phases in the products.

| Examples | Pore Diameter, Angstroms |
| --- | --- |
| 1 | 32.2 |
| 2 | 35.4 |
| 3 | 42.5 |
| 4 | 39.6 |
| 5 | 16.9 |
| 6 | 27.3 |
| 7 | 36.6 |
| 8 | 42.6 |
| 9 | 28.3 |
| 10 | 22.8, 30.8 |
| 11 | 36.8 |
| 12 | 36.1 |
| 13 | 35.0, 42.1 |
| 14 | 40.0 |
| 15 | 8.3 |
| 16 | 22.4, 30.4 |
| 17 | 15.0 |

EXAMPLE 22

Argon Physisorption For Pore Systems Over About 60 Angstroms Diameter

The above method of Horvath and Kawazoe for determining pore size from physisorption isotherms was intended to be applied to pore systems of up to 20 Angstroms diameter; but with some care as above detailed, its use can be extended to pores of up to 60 Angstroms diameter.

In the pore regime above 60 Angstroms diameter, however, the Kelvin equation can be applied. It is usually given as:

$$\ln(P/P_o) = \frac{-2\gamma V}{r_k RT} \cos \theta$$

where:
$\gamma$=surface tension of sorbate
V=molar volume of sorbate
$\theta$=contact angle (usually taken for practical reasons to be 0)
R=gas constant
T=absolute temperature
$r_k$=capillary condensate (pore) radius
$P/P_o$=relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

The products of Examples 19 and 20 were subjected to the Dollimore and Heal Method for argon physisorption data, as indicated.

EXAMPLE 23

Transmission Electron Microscopy

To further illustrate the nature of the crystalline product of this invention, samples of the products from Examples 1 through 14 and 16 through 20 were studied by transmission electron microscopy (TEM) as noted above. TEM is a technique used to reveal the microscopic structure of materials, including crystalline materials.

In order to illuminate the microstructure of materials, samples must be thin enough for an electron beam to pass through them, generally about 500-1000 Angstrom units or so thick. The crystal morphology of the present materials usually required that they be prepared for study by ultramicrotomy. While time consuming, this technique of sample preparation is quite familiar to those skilled in the art of electron microscopy. The materials are embedded in a resin, in this case a commercially available low viscosity acrylic resin L.R. WHITE (hard), which is then cured at about 80° C. for about 1½ hours. Thin sections of the block are cut on an ultramicrotome using a diamond knife and sections in the thickness range 500-1000 Angstrom units are collected on fine mesh electron microscope support grids. For these materials, an LKB model microtome with a 45° C. diamond knife edge was used; the support grids were 400 mesh copper grids. After evaporation of a thin carbon coating on the sample to prevent charging in the microscope (light gray color on a white sheet of paper next to the sample in the evaporator), the samples are ready for examination in the TEM.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDP's are readily produced on modern TEM instruments using, e.g. the selected area field limiting aperture technique familiar to those skilled in the art of electron microscopy. When an EDP with the desired arrangement of diffraction spots is observed the corresponding image of the crystal giving that EDP will reveal details of the microstructure along the direction of projection indicated by the EDP. In this way, different projections of a crystal's structure can be observed and identified using TEM.

Figure 18:
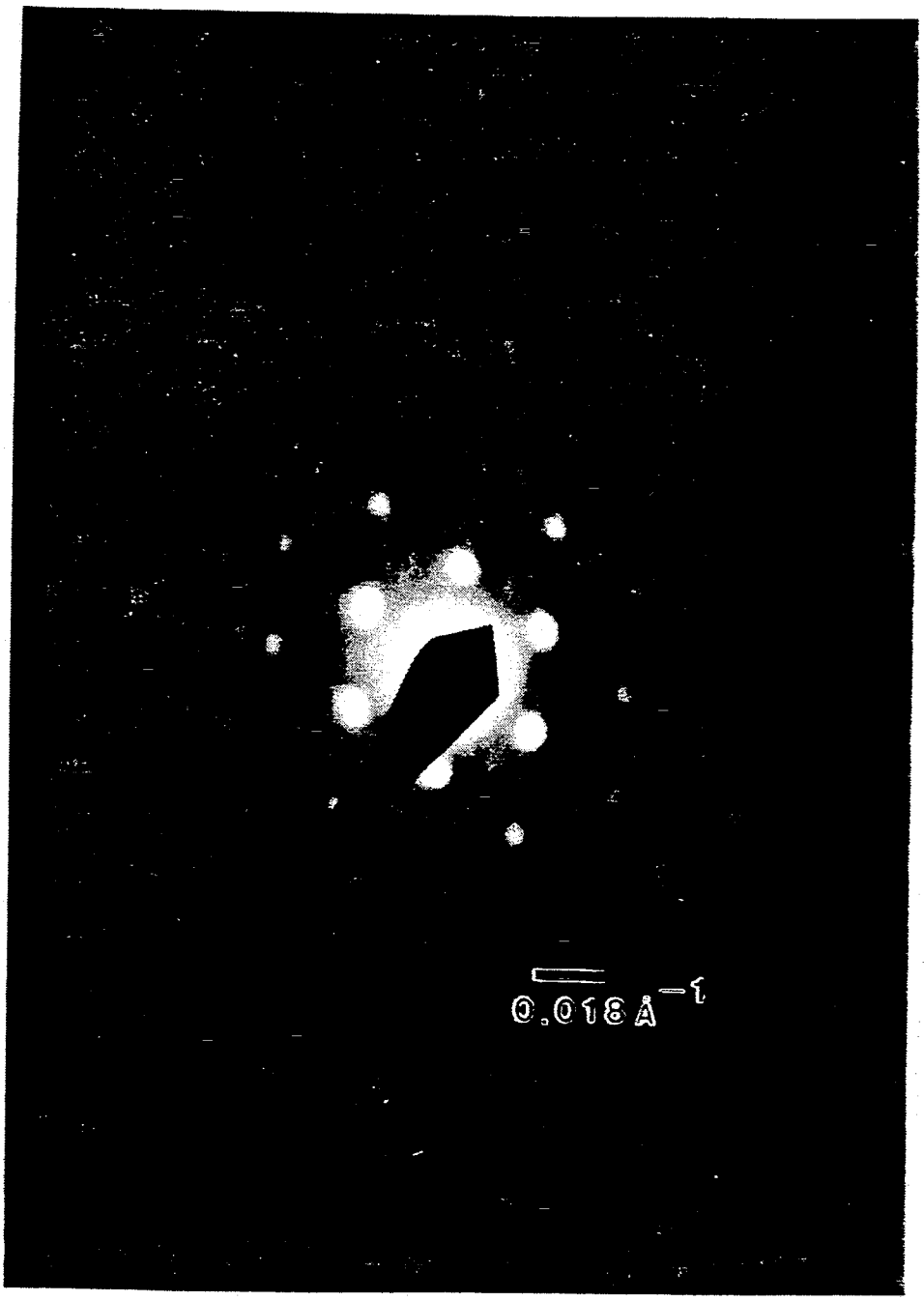
FIG. 18 is an electron diffraction pattern of the product of Example 4.

In order to observe the salient features of the crystalline product of the present invention, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. An example of a hexagonal pattern from an individual crystal from the product in Example 4 is shown in FIG. 18. The number of diffraction spots observed depends to a degree upon the regularity of the crystalline arrangement in the material, among other things. At the very least, however, the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located. This latter technique was used to produce the electron micrographs discussed below.

Microtomed samples of materials from the Examples were examined by the techniques described above in a JEOL 200 CX transmission electron microscope operated at 200,000 volts with an effective 2 Angstrom objective aperture in place. The instrument has a point-to-point resolution of 4.5 Angstroms. Other experimental arrangements familiar to one skilled in the art of high resolution (phase contrast) TEM could be used to produce equivalent images provided care is taken to keep the objective lens on the underfocus (weak leans) side of the minimum contrast lens current setting. FIG. 19 is an electron micrograph from a microtomed thin section of the crystalline product from Example 4. This micrograph shows a reasonably regular array of large channels in a hexagonal arrangement. The repeat distance between the channels is about 45 Angstrom units, which is consistent with the position of the first peak in the X-ray diffraction pattern (41 Angstroms/ 3/2) of this material. Since the channels must have walls between them, this observation is also consistent with the estimated pore size of about 39.6 Angstrom units calculated from Argon physisorption measurements of this material in Example 17.

FIG. 20 is an electron micrograph from a microtomed thin section of the crystalline product from Example 5. This micrograph shows a reasonably regular array of somewhat smaller channels in a hexagonal arrangement. The repeat distance between the channels is about 30 Angstrom units, which is consistent with the position of the first peak in the X-ray diffraction pattern (25 Angstroms/ 3/2) of this material. The smaller pore size of this material was also verified by Argon physisorption measurements reported in Example 22(a), where a value of 16.9 Angstrom units was calculated for the material in Example 5.

FIG. 21 is an electron micrograph from a microtomed thin section of the crystalline product from Example 19. The channels in this image are quite large and rather irregular, but the characteristic hexagonal arrangement of the material of the present invention is evident.

Having described how to make and characterize the preferred ultra large pore materials for use herein, we will now describe other preferred, but conventional, components of cracking catalyst.

Large Pore Cracking Component

In addition to the ultra large pore component, it will usually be beneficial to include catalytically effective amounts of a conventional large pore zeolite. Some of these, and patents describing their preparation are discussed hereinafter. Zeolite L, zeolite X, zeolite Y, and preferably higher silica forms of zeolite Y such as Dealuminized Y (DAY Y; U.S. Pat. No. 3,442,795); Ultrastable Y (USY; U.S. Pat. No. 3,449,070), Ultrahydrophobic Y (UHP-Y U.S. Pat. No. 4,331,694; U.S. Pat.

No. 4,401,556), and similar materials are preferred for use herein. Zeolite beta (B, U.S. Pat. No. 3,308,069) or Zeolite L (U.S. Pat. No. 3,216,789; U.S. Pat. No. 4,544,539; U.S. Pat. No. 4,554,146 and U.S. Pat. No. 4,701,315) may also be used. These materials may be subjected to conventional treatments, such as impregnation or ion exchange with rare earths to increase stability. These patents are incorporated herein by reference.

These large-pore molecular sieves have a geometric pore opening of about 7 angstroms in diameter. In current commercial practice, most of the cracking of large molecules in the feed is done using these large pore molecular sieves, while cracking of extremely large molecules is usually left to the amorphous matrix. In contrast, in the process of the present invention, the ultra large pore material cracks the extremely large molecules (more efficiently than the amorphous matrix) and leaves cracking of the remainder to the large-pore molecular sieve.

Very Large Pore Cracking Component

In addition to the ultra-large and large-pore cracking components described, several recently developed very large-pore cracking components may also be used. All of these materials have a geometric pore opening or portal greater than about 7 Angstroms in diameter.

VPI-5 is a molecular sieve with pore openings or portals larger than about 10 Angstrom units in diameter. They are aluminophosphate based sieves with 18-membered rings of tetrahedrally-coordinated or T-atoms. They resemble the better known $AlPO_4$-5 materials. Such molecular sieves have very large pore volumes, and extremely large pore openings. Such large pore sieves would be very useful for cracking the very large molecules associated with high boiling or residual fractions. By contrast faujasites have portals containing 12 membered rings. VPI-5 was described by M. Davis, C. Saldarriaga, C. Montes, and J. Garces in a paper presented at "Innovations in Zeolite Materials Science" Meeting in Nieuwpoort, Belgium, Sep. 13-17, 1987. M. E. Davis, C. Saldarriaga, C. Montes, J. Garces and C. Crowder, Nature 331, 698 (1988).

Pillared, interlayered clays may also be used as a large pore cracking component. U.S. Pat. No. 4,742,033 discloses a pillared interlayered clay. This patent is incorporated by reference.

U.S. Pat. No. 4,515,901 discloses forming an interlayered pillared clay by mixing a clay with a polar solvent, a soluble carbohydrate, and a soluble pillaring agent. The mixture is then heated to form the interlayered pillared clay. Useful clays are smectites such as montmorillonite.

In U.S. Pat. No. 4,367,163, pillars of silica added to smectites increase the interplatelet distances. U.S. Pat. Nos. 4,515,901, and 4,367,163 are incorporated herein by reference.

U.S. Pat. No. 4,757,041, which is incorporated herein by reference, discloses a class of pillared interlayered clay molecular sieves products with regularly interstratified mineral structure. These materials are prepared by cross-linking interstratified mineral clay, and are reported to possess extraordinary thermal and hydrothermal stabilities.

U.S. Pat. No. 4,600,503 (Angevine et al), which is incorporated herein by reference, discloses thermally stable layered metal oxides containing interspathic polymeric oxides employed in hydrotreating catalyst used to upgrade residual oils. The layered materials disclosed in that patent may be used as all of part of the "large pore" cracking component of the catalyst of the present invention.

Published European patent application EP 0 284 278 A2 (Kirker et al), which is incorporated herein by reference, discloses hydrocracking a heavy feed containing polycyclic aromatics to form a lube based stock. The hydrocracking catalyst is a layered silicate such as magadiite which contains interspathic polymeric silica and interspathic polymeric oxides of one or more of Al, B, Cr, Ga, In, Mo, Nb, Ni, Ti, Tl, W and Zr. Such layered silicates may be used as all or part of the large pore cracking component of the present invention.

Published European Application EP 0 205 711 A2 (Chu et al), which in incorporated herein by reference, discloses layered oxides containing interlayer polymeric oxides and their synthesis. Layered oxides of high thermal stability and surface area which contain interlayer polymeric oxides such as polymeric silica are prepared by ion exchanging a layered metal oxide, such as layered titanium oxide, with organic cation to spread the layers apart. A compound, such as tetraethylorthosilicate, capable of forming a polymeric oxide, is thereafter introduced between the layers. The resulting product is treated to form polymeric oxide, e.g., by hydrolysis to produce the layered oxide product. Such layered materials may be as used all or part of the large pore cracking component of the present invention.

U.S. Pat. No. 4,238,364 discloses the preparation of stabilized pillared, interlayered clays. U.S. Pat. No. 4,665,220 discloses use of these clays as catalysts in reactions capable of catalysis by protons. The contents of both of these patents are incorporated herein by reference.

SAPO's, or silicon-substituted aluminophosphates, such as SAPO-37, which have a three dimensional crystal framework of suitable size may also be used as the large pore cracking component. U.S. Pat. Nos. 4,440,871, 4,741,892 and 4,689,138, which are incorporated herein by reference, disclose silicoaluminophosphate molecular sieves.

It should be emphasized that the process and catalyst of the present invention does not require the use of any "large pore" cracking component. It is essential to have at least one ultra large pore cracking component, e.g., MCM-41, and highly preferred to include as well a large pore cracking component.

The large pore component may comprise mixtures of one or more of suitable materials, e.g., an equal mix of catalytically active forms of RE-USY, VPI-5 and a pillared clay.

Expressed as Constraint Index, CI, the large pore cracking component should have a CI of less than 1 and preferably less than 0.8. Details of the Constraint Index test procedures are provided in J. Catalysis 67, 218-222 (1981) and in U.S. Pat. No. 4,711,710 (Chen et al), which are incorporated herein by reference.

Shape Selective Zeolites

Shape selective zeolites are highly beneficial additives to or part of the ultra large pore cracking catalyst. Any zeolite having a constraint index of 1-12 can be used herein but ZSM-5 is especially preferred. Details of the Constraint Index test procedures are provided in J. Catalysis 67, 228-222 (1981) and in U.S. Pat. No. 4,711,710 (Chen et al), both of which are incorporated herein by reference.

Preferred shape selective zeolites are exemplified by ZSM-5, ZSM-11, ZSM-12, ZSM-23, ZSM-35, ZSM-48, ZSM-57 and similar materials.

ZSM-5 is described in U.S. 3,702,886, U.S. Pat. No. Re. 29,948 and in U.S. Pat. No. 4,061,724 (describing a high silica ZSM-5 as "silicalite").

ZSM-11 is described in U.S. Pat. No. 3,709,979.
ZSM-12 is described in U.S. Pat. No. 3,832,449.
ZSM-23 is described in U.S. Pat. No. 4,076,842.
ZSM-35 is described in U.S. Pat. No. 4,016,245.
ZSM-57 is described in U.S. Pat. No. 4,046,859.
MCM-22 is described in U.S. Pat. No. 4,954,325.

These patents are incorporated herein by reference.

Zeolites in which some other framework element is present in partial or total substitution of aluminum can be advantageous. Elements which can be substituted for part of all of the framework aluminum are boron, gallium, zirconium, titanium and trivalent metals which are heavier than aluminum. Specific examples of such catalysts include ZSM-5 and zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

Preferably, relatively high silica shape selective zeolites are used, i.e., with a silica/alumina ratio above 20/1, and more preferably with a ratio of 70/1, 100/1, 500/1 or even higher.

Preferably the shape selective zeolite is placed in the hydrogen form by conventional means, such as exchange with ammonia and subsequent calcination. The hydrogen form of ZSM-5 is believed to be optimum for paraffin cracking. The zeolite may be used in any form, however which is useful in the cracking process. It will frequently be beneficial to use a shape selective zeolite component which promotes paraffin aromatization at catalytic cracking conditions.

Gallium ZSM-5 is especially preferred for use herein because of its ability to convert light paraffins such as propanes and butanes into aromatic hydrocarbons which are valuable as petrochemicals or as high octane gasoline blending components. Gallium may be incorporated into the zeolite framework during synthesis or it may be exchanged or impregnated or otherwise incorporated into the ZSM-5 after synthesis. Preferably 0.05 to 10 and most preferably 0.1 to 2.0 wt % gallium is associated with the aromatization zeolite.

More details on paraffin aromatization zeolites, and their use in catalytic cracking, may be taken from U.S. Pat. Nos. 4,988,653; 4,929,339 and 5,006,497, which are incorporated herein by reference.

Catalyst Manufacture

The ultra large pore cracking catalyst can be made using conventional techniques for mixing molecular sieves and matrix materials.

The different zeolite or molecular sieve components can be dry blended or wet ball milled together, and then added to a suitable matrix, e.g., a silica-alumina gel, clay composite or an alumina-clay composite and further mixed. The matrix and zeolite mixture can be extruded, pilled, marumerized, dropped in an oil bath, etc. to form relatively large particles. For use in fluidized bed catalytic cracking units he matrix-zeolite mixture is preferably spray dryed, but any other means can be used to make fluidizable catalyst particles, such as crushing or grinding larger size extrudates or pills.

It is preferred to have the crystalline zeolite or molecular sieve component in a suitable matrix, since this catalyst form is generally characterized by a high resistance to attrition, high activity and exceptional steam stability. Such catalysts are readily prepared by dispersing the crystalline zeolite in a suitable siliceous sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria silica-beryllia, silica-titania, as well as ternary combinations such as silica-alumina-magnesia, silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent, and the other metal oxide or oxides content will generally be within the range of 0 to 45 weight percent and preferably 5 to 40 weight percent. In addition to the above, the matrix may also comprise natural or synthetic clays, such as kaolin type clays, montmorillonite, bentonite or halloysite. These clays may be used alone or in combination with silica or any of the above specified cogels in matrix formulation.

The conventional, large pore cracking component, if included, may be present in catalytically effective amounts, preferably 10 to 50 wt % of the finished catalyst, or catalyst inventory if blends of different materials are used. Usually it will be preferred to use relatively large amounts of the ultra large pore cracking component, because such materials have only moderate cracking activity. Thus, catalyst containing 20 wt. % RE-USY zeolite, and 20 to 40 wt % MCM-41 will give very good results. Expressed as weight percent of total catalyst, the ultra large pore cracking catalyst would have the following composition when the ultra large pore cracking catalyst contains 50 wt. % total zeolite:

Matrix—50 wt. %
Large pore molecular sieve—20 wt. %
Ultra large pore molecular sieve—30 wt. %

Preferably the catalyst contains the following amounts of zeolite in a matrix.

| COMPONENT | PREFERRED | MOST PREFERRED |
|---|---|---|
| Large Pore Sieve | 5-50 wt % | 10-45 wt % |
| Ultra Large Pore Material | 10-80 wt % | 15-50 wt % |
| Shape Selective Zeolite | 0.1-20 wt % | 0.5-5 wt % |

Examples of Catalyst Preparation

EXAMPLE 24

A sample of MCM-41 [(89-JCV-682A)] was calcined in $N_2$ at 1000° F. for 1 hour and for an additional 6 hours in air. Properties of the calcined material are shown in Table 1.

EXAMPLE 25

An FCC catalyst comprising 35% MCM-41 in a silica-alumina-clay matrix was prepared as follows: 1297 g of MCM-41 [89-JCV-682A] was ball-milled for 16 hours in 2288 cc $H_2O$. The product was rinsed from the mill with 525 cc of $H_2O$.

A slurry was prepared containing 8270 g of $H_2O$, 335 g of kaolin clay (Georgia Kaolin Kaopaque), and 1754 g of hydrous silica (Philadelphia Quartz N-brand). The slurry was stirred and 164 g of $H_2SO_4$ (96.7%) was added over a 30 minute period. 229 g of $Al_2(SO_4)_3 \cdot 16H_2O$ dissolved in 922 of $H_2O$ was added dropwise. 3962 g of the ball-milled MCM-41 slurry (11.36% solids) was added to the silica-alumina-clay slurry and the mixture was vigorously stirred at 800 rpm for 30 minutes and then filtered.

The solid was re-slurried in $H_2O$ and spray dried. The spray dried product was slurried with $H_2O$ and the fines floating on the slurry were discarded. The remaining solid was exchanged with 1N $NH_4NO_3$ (5 cc $NH_4NO_3$/g of solid). The solid was washed with $H_2O$, filtered, and dried in an oven at 250° F.

A 50 g sample of this material was calcined at 540° C. for one hour in $N_2$ and 6 hours in air. The remainder of the oven-dried solid was steamed in 45% $H_2O$ at 1200° F. for four hours at 0 psig. Prior to admitting steam to the reactor the sample was heated to 1200° F. in $N_2$. Air was gradually increased over a ½ period while the $N_2$ flowrate was increased. After the ½ hour period steam was admitted for the four hour period. Properties of the catalyst after spray drying, $NH_4$ exchange, and steaming are shown in Table 2.

EXAMPLE 26

A comparison catalyst was prepared by mixing 1828 g of kaolin (Kaopaque) clay and 9440 g of hydrous silica (N-brand) in 43.5 kg of $H_2O$. 883 g of $H_2SO_4$ (96.4%) was added over a 30 minute period. 1233 g of $Al_2(SO_4)_3 \cdot 16H_2O$ dissolved in 4970 g of $H_2O$ was slowly added to the slurry which was stirred for 75 minutes and then filtered. The wet solid was re-slurried in $H_2O$ (10.1% solids) and spray dried.

The spray dried product was slurried with $H_2O$ and the fines floating on the slurry were discarded. The remaining solid was exchanged with 1N $NH_4NO_3$ (5 cc $NH_4NO_3$/g of solid). The solid was washed with $H_2O$, filtered and dried in a drying oven at 250° F.

A 30 g sample of the oven-dried product was calcined in air at 1000° F. for 2 hours. The remainder of the oven-dried solid was steamed in 45% $H_2O$ at 1200° F. for four hours at 0 psig. Properties of the catalyst after spray drying, $NH_4$ exchange, and steaming are shown in Table 2.

EXAMPLE 27

The calcined and steamed catalysts from Examples 25, 26 and 27 were evaluated for the dealkylation of tri-tertiarybutylbenzene (TTBB). Run conditions were 225° C., 100 WHSV, using 0.05 g of catalyst dispersed in 0.45 g of quartz. The feed was 6 wt % TTBB dissolved in toluene. Results are displayed in Table 3. The MCM-41 is much more active than the silica-alumina-clay catalyst for dealkylation of TTB when calcined or steamed.

EXAMPLE 28

A comparison catalyst containing 35 wt % of a commercial USY was prepared by mixing 1489 g of kaoline (Kaopaque) clay and 7800 g of hydrous silica (N-brand) in 36.8 kg of $H_2O$. 729.3 g of $H_2SO_4$ (96.7%) was added over a 30 minute period. 1018 g of $Al_2(SO_4)_3 \cdot 16H_2O$ dissolved in 4107 g of $H_2O$ was slowly added to the slurry which was stirred for 75 minutes and then filtered. The wet solid was re-slurried in $H_2O$ (10.5% solids) and spray dried.

The spray dried product was slurried with $H_2O$ and the fines floating on the slurry were discarded. The remaining solid was exchanged with 1N $NH_4NO_3$ (5 cc $NH_4NO_3$/g of solid). The solid was washed with $H_2O$, filtered, and dried in a drying over at 250° F.

The dried solid was steamed in 45% $H_2O$ at 1200° F. for four hours at 0 psig. XRD indicated the sample had ~32 wt % of USY in the sample.

EXAMPLE 29

An additional comparison catalyst was prepared as in Example 7 except that the steaming was completed at 1450° F. for 10 h in 45 wt % $H_2O$ rather than at 1200° F. XRD indicated the sample contained approximately 22 wt % USY.

EXAMPLE 30

A comparison catalyst containing 10 wt % of a commercial USY was prepared by mixing 1091 g of kaoline (Kaopaque) clay and 5667 g of hydrous silica (N-brand) in 26.8 kg of $H_2O$. 512.4 g of $H_2SO_4$ (96.7%) was added over a 30 minute period. 740 g of $Al_2(SO_4)_3 \cdot 16H_2O$ dissolved in 2988 g of $H_2O$ was slowly added to the slurry which was stirred for 75 minutes and then filtered. The wet solid was re-slurried in $H_2O$ (10.5% solids) and spray dried.

The spray dried product was slurried with $H_2O$ and the fines floating on the slurry were discarded. The remaining solid was exchanged with 1N $NH_4NO_3$ (5 cc $NH_4 5NO_3$/g of solid). The solid was washed with $H_2O$, filtered, and dried in a drying oven at 250° F., and steamed as in Ex. 29. XRD showed 9 wt % USY in the sample.

EXAMPLE 31

A catalyst was prepared by blending the catalysts of examples 35 and 30 in equal weight proportions.

EXAMPLE 32

Figure 22A:
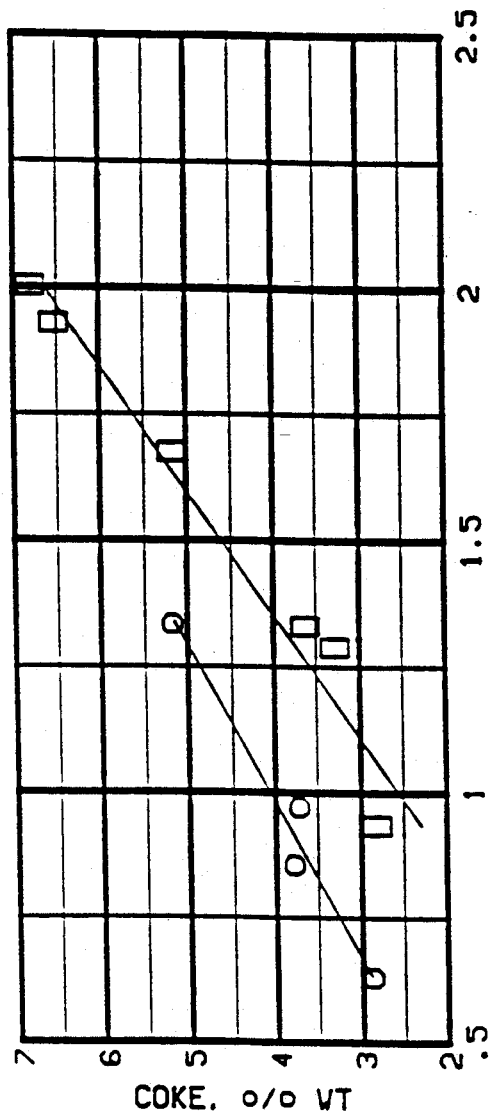
Figure 22B:
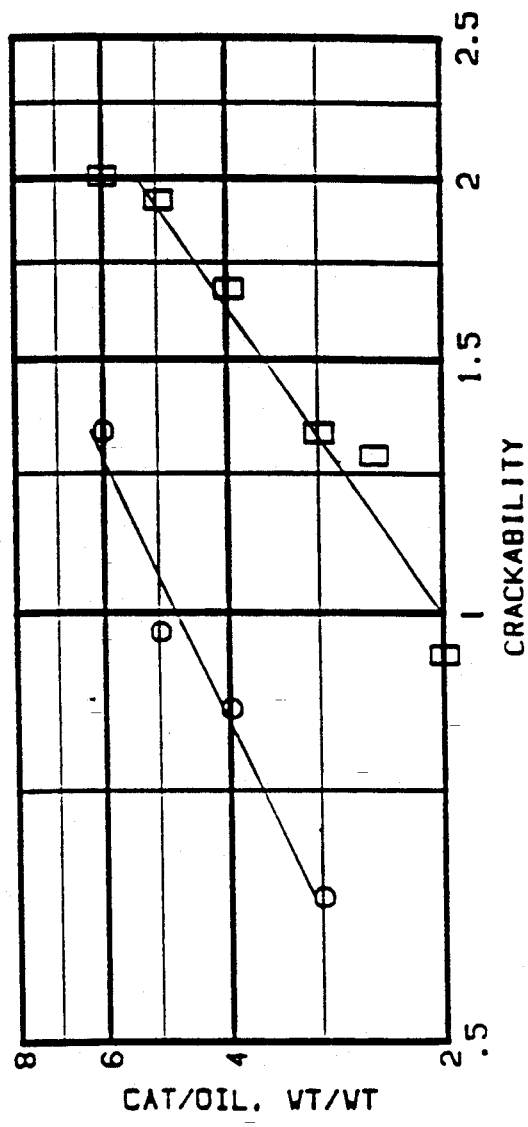

The steamed catalysts from Examples 25 and 26 were evaluated for cracking Joliet Sour Heavy Gas Oil (JSHGO) in a fixed-fluidized bed unit at 960° F. and one minute on stream. The JSHGO used has the properties shown in Table 4. The cat/oil was varied from 2.0 to 6.0 to examine a wide range of conversions. The yields at 4.0% coke and 55% conversion are summarized in Table 5. A plot of (% conversion)/(110% conversion) vs. cat/oil and coke are shown in FIG. 22. Selectivity to gasoline and research octane number as a function of conversion are shown in FIG. 23. Squares show MCM-41 data, catalyst from Ex. 25. Circles represent data from Example 26.

EXAMPLE 33

Figure 24A:
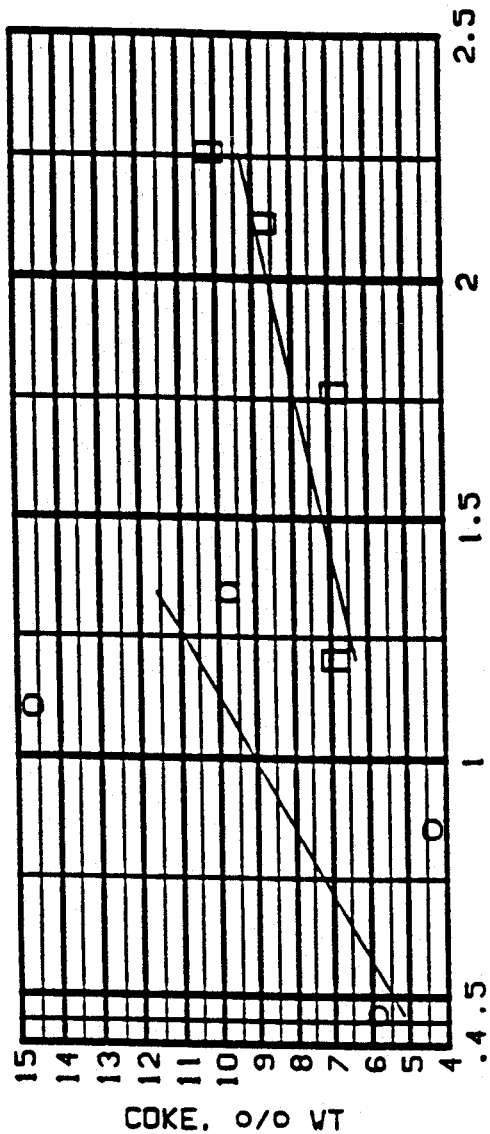
Figure 24B:
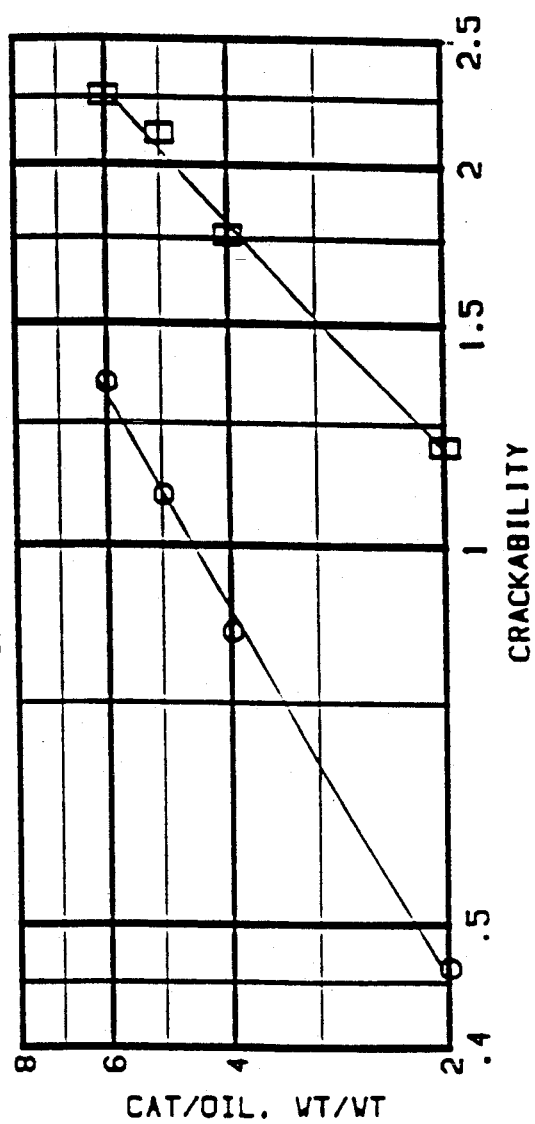

The steamed catalysts from Examples 25 and 26 were evaluated for cracking Arab Light Atmospheric Resid (ALAR) in a fixed-fluidized bed unit at 960° F. and 1.0 minute on stream. The ALAR used has the properties shown in Table 4. The cat/oil was varied from 2.0 to 6.0 to examine a wide range of conversions. The yields at 9.0% coke and 55% conversion are summarized in Table 6. A plot of (% conversion)/(100% conversion) vs. cat/oil and coke are shown in FIG. 24. Selectivity to gasoline and research octane as a function of conversion are shown in FIG. 25. Squares show MCM-41 data (Ex.

25 catalyst). Circles show silica alumina clay data (Ex. 26 catalyst).

The results show that the MCM-41 catalyst is more active and gasoline selective than the comparative catalyst. The MCM-41 catalyst also displays superior coke selectivity. Significantly greater quantities of $C_5$ olefins are made with MCM-41.

EXAMPLE 34

The steamed catalysts from examples 25 and 26 were evaluated for cracking JSHGO in a fixed-fluidized bed unit as described in Example 32 except that the reactor temperature was held at 960°, 900°, and 860° F. Each catalyst was evaluated at at least two different cat/oil ratios. Results are summarized in Tables 7, 8, and 9 for reactor temperatures of 960°, 900°, and 860°, respectively.

EXAMPLE 35

The catalysts of examples 25 and 29 were evaluated for cracking JSHGO as described in example 32. Results comparing selectivities at 65 vol % conversion are summarized in Table 10.

EXAMPLE 36

The catalyst of examples 25 and 29 were evaluated for cracking ALAR as described in example 33. Results comparing selectivites at 67 vol% conversion are summarized in Table 11.

EXAMPLE 37

The catalysts of examples 25, 30, and 31 were evaluated for cracking ALAR as described in example 33. Results comparing selectivities at 60 vol% conversion are summarized in Table 12.

EXAMPLE 38

The liquid products, obtained by cracking JSHGO at 960° F., 1.0 minute on-stream with a cat/oil ratio of 4 using the catalysts of examples 25 and 26, were evaluated for various product properties. Results are summarized for gasoline, LFO, and HFO in Tables 13, 14, and 15.

TABLE 1
Physical Properties of MCM-41

| | |
|---|---|
| $SiO_2$, wt % | 85 |
| $Al_2O_3$, wt % | 5.4 |
| Na, Wt% | 2.2 |
| Ash, wt % | 96.4 |
| Surface Area, $m^2/g$ | 973 |
| Adsorption, g/100 g | |
| $H_2O$, | 21 |
| $c-C_6$, | 44 |
| $n-C_6$, | 31 |

TABLE 2

| | Spray Dried | $NH_4$ Exchanged | Calcined | Steamed |
|---|---|---|---|---|
| Physical Properties of MCM-41 Catalyst of Example 25 | | | | |
| $SiO_2$, wt % | 45.0 | 49.8 | | 71.0 |
| $Al_2O_3$, wt % | 8.6 | 9.4 | | 13.6 |
| Na, wt % ppm | — | 120 | | |
| C, | 14.0 | 16.0 | | 0.1 |
| N, wt % | | 1.3 | 1.5 | 0.04 |
| Ash, wt % | 63.5 | 67.0 | | 91.1 |
| Ave. Part Size, mμ | 63 | | | 90 |
| Packed Density, g/cc | | .39 | .37 | .43 |
| Surface Area, $m^2/g$ | | 208 | 647 | 307 |
| Adsorption, g/100 g | | | | |
| $H_2O$ | | | 16 | 2 |
| $c-C_6$, | | | 27 | 12 |
| $n-C_6$, | | | 20 | 9 |
| Physical Properties of Comparison Catalyst of Example 26 | | | | |
| $SiO_2$, wt % | 46.2 | | 67.2 | 77.6 |
| $Al_2O_3$, wt % | 12.4 | 16.4 | | 18.8 |
| Na, wt % | 5.1 | 130 ppm | | 190 ppm |
| Ash, wt % | 79.8 | 87.9 | | 98.5 |
| Packed Density, g/cc | 1.10 | .85 | .88 | .63 |
| Real Density, g/cc | | | 2.36 | 2.37 |
| Particle Density, g/cc | | | 1.50 | 1.53 |
| Pore Volume, cc/g | | | .24 | .23 |
| Surface Area, $m^2/g$ | | 425 | 319 | 188 |
| Adsorption, g/100 g | | | | |
| $H_2O$ | | 11 | 6 | — |
| $c-C_6$, | | 13 | 12 | 8 |
| $n-C_6$, | | 10 | 6 | — |

TABLE 3
TTBB Dealkylation[1]

| Catalyst Material | % TTBB Dealkylated |
|---|---|
| Example 24 calcined | 97 |
| Example 25 calcined | 86 |
| Example 25 steamed | 45 |
| Example 26 calcined | 49 |
| Example 26 steamed | 18 |

[1]Run Conditions 6% Tri-tert-butylbenzene in toluene, 225° C., 100 WHSV, 0.05 g cat in 0.45 g quartz

TABLE 4

| Chargestock | JSHGO[1] | ALAR[2] |
|---|---|---|
| Density, g/cc | 0.8918 | 0.9016 |
| Aniline Pt., °F. | | 177.5 |
| Hydrogen, wt % | 12.13 | 11.96 |
| Sulfur, wt % | 2.4 | 2.9 |
| Nitrogen, wt % | 0.41 | 0.13 |
| Basic Nitrogen, ppm | 382 | 309 |
| Conradson Carbon, wt % | 0.54 | 6.83 |
| KV 100°, cS | 8.50 | 12.44 |
| KV 40°, cS | NA | 123.8 |
| Bromine No. | 8.66 | 3.55 |
| R.I. 70° F. | 1.496 | NA |
| Pour Point, °F. | 90 | 45 |
| Ni, ppm | 0.34 | 15 |
| V, ppm | 0.39 | 27 |
| Na, ppm | 1.3 | 2.0 |
| Fe, ppm | 0.3 | 2.0 |
| Distillation Profile | | |
| % Vol Distilled | | |
| 5 | 598° F. | 561° F. |
| 10 | 655 | 627 |
| 20 | 719 | 682 |
| 30 | 765 | 736 |
| 40 | 804 | 794 |
| 50 | 839 | 855 |
| 60 | 875 | 919 |
| 70 | 913 | 994 |
| 80 | 957 | 1075 |
| 90 | 1016 | 1127 |
| 100 | 1113 | 1127 (86%) |
| % unrecovered | 0 | 13.1 |

[1]Joliet Sour Heavy Gas Oil
[2]Arab Light Atmospheric Resid

TABLE 5
Comparison of M41S and Silica-Alumina-Clay (SAC) Catalyst Cracking JSHGO

| | SAC | M41S | Δ |
|---|---|---|---|
| Coke, wt % | 4.0 | 4.0 | |
| Conversion, wt % | 48.5 | 56.8 | 8.3 |
| $C_5$+ gasoline, wt % | 32.6 | 37.2 | 4.6 |

TABLE 5-continued
Comparison of M41S and Silica-Alumina-Clay (SAC) Catalyst Cracking JSHGO

|  | SAC | M41S | Δ |
|---|---|---|---|
| RON | 92 | 92 | — |
| LFO, wt % | 36.7 | 32.2 | −4.5 |
| HFO, wt % | 14.7 | 11.0 | −3.7 |
| $C_4$'s, vol % | 9.7 | 13.3 | 3.6 |
| Light gas, wt % | 5.9 | 7.3 | 1.4 |
| $H_2$=, wt % | .08 | .04 | −0.04 |
| $C_5$, vol % | 3.7 | 4.7 | 1.0 |
| Conversion, vol % | 55 | 55 |  |
| $C_5$+ gasoline, wt % | 34.9 | 36.0 | 1.1 |
| RON | 92 | 92 | — |
| LFO, wt % | 35.0 | 33.6 | −1.4 |
| HFO, wt % | 11.3 | 13.1 | −1.8 |
| Coke, wt % | 4.7 | 3.3 | −1.4 |
| Light gas, wt % | 6.8 | 6.3 | −0.5 |
| $H_2$=, wt % | .10 | .04 | −0.06 |
| $C_5$, vol % | 3.8 | 4.6 | 0.8 |

TABLE 6
Comparison of M41S and Silica-Alumina-Clay (SAC) Catalyst Cracking ALAR

|  | SAC | M41S | Δ |
|---|---|---|---|
| Coke, wt % | 9.0 | 9.0 |  |
| Conversion, wt % | 52.9 | 68.2 | 15.3 |
| $C_5$+ gasoline, wt % | 28.1 | 33.5 | 5.4 |
| RON | NA | NA |  |
| LFO, wt % | 37.5 | 26.7 | −10.8 |
| HFO, wt % | 9.7 | 6.3 | −3.4 |
| $C_4$'s, vol % | 10.7 | 17.4 | 6.7 |
| Light gas, wt % | 8.0 | 13.5 | 5.6 |
| $H_2$=, wt % | 0.10 | 0.11 | 0.01 |
| $C_5$, vol % | 3.8 | 5.0 | 1.2 |
| Conversion, vol % | 55 | 55 |  |
| $C_5$+ gasoline, wt % | 28.7 | 32.6 | 3.9 |
| RON | NA | NA | — |
| LFO, wt % | 36.4 | 36.7 | 0.3 |
| HFO, wt % | 8.9 | 8.8 | −0.1 |
| Coke, wt % | 10.7 | 6.8 | −3.9 |
| $C_4$'s, vol % | 11.2 | 11.2 | — |
| Light gas, wt % | 8.3 | 8.0 | −0.3 |
| $H_2$=, wt % | 0.10 | 0.08 | −0.02 |
| $C_5$, vol % | 3.7 | 4.4 | 0.7 |

TABLE 7
(Example 34)
MCM-41 VS USY AND SAC EFFECT OF TEMP - 960° F.
STEAMED 4 H, 1200° F., 45 PCT H2O, 0 PSIG
FIXED-FLUIDIZED BED, 960° F., 1 MIN ON-STREAM, JSHGO

|  | MCM-41 | MCM-41 | SAC | SAC | USY | USY |
|---|---|---|---|---|---|---|
| TREATMENT: HOURS | 4.0 | 4.0 | 4.0 | 4.0 | 4.0 | 4.0 |
| : TEMPERATURE, DEG° F. | 1200 | 1200 | 1200 | 1200 | 1200 | 1200 |
| : % STEAM | 45 | 45 | 45 | 45 | 45 | 45 |
| Cat/Oil | 4.98 | 2.00 | 4.99 | 2.99 | 3.96 | 2.00 |
| WHSV | 12.04 | 29.95 | 12.03 | 20.04 | 1.15 | 29.97 |
| Reaction Temperature, Deg° F. | 947 | 947 | 951 | 951 | 949 | 946 |
| Conversion, % Wt | 63.6 | 46.9 | 48.8 | 37.8 | 79.7 | 75.9 |
| Conversion, % Vol | 65.9 | 48.3 | 49.2 | 38.7 | 82.2 | 78.8 |
| $C_5$+ Gasoline, % Vol | 45.9 | 40.2 | 39.6 | 31.0 | 52.1 | 58.6 |
| $C_5$+ Gasoline, % Wt | 37.7 | 33.4 | 32.9 | 25.8 | 2.6 | 48.0 |
| TOTAL C4, % Vol | 16.5 | 8.7 | 9.7 | 7.3 | 18.7 | 19.3 |
| Dry Gas, % Wt | 8.9 | 5.1 | 5.9 | 4.5 | 11.5 | 8.8 |
| Coke, % Wt | 6.53 | 2.81 | 3.75 | 2.88 | 13.78 | 6.95 |
| C—On-Cat, Final, % Wt | 1.15 | 1.21 | 0.65 | 0.85 | 3.03 | 2.90 |
| N—C5, % Vol | 0.4 | 0.2 | 0.3 | 0.2 | 1.0 | 0.7 |
| I—C5, % Vol | 5.3 | 2.3 | 2.9 | 2.2 | 9.3 | 10.6 |
| C5=, % Vol | 4.6 | 3.7 | 3.8 | 2.6 | 1.5 | 1.8 |
| N—C4, % Vol | 1.0 | 0.5 | 0.6 | 0.5 | 2.5 | 2.3 |
| N—C4, % Wt | 0.7 | 0.3 | 0.4 | 0.3 | 1.6 | 1.5 |
| I—C4, % Vol | 8.1 | 3.3 | 4.0 | 2.9 | 12.4 | 12.6 |
| I—C4, % Wt | 5.0 | 2.0 | 2.5 | 1.8 | 7.6 | 7.7 |
| C4=, % Vol | 7.3 | 4.9 | 5.1 | 4.0 | 3.8 | 4.4 |
| C4=, % Wt | 4.8 | 3.3 | 3.4 | 2.6 | 2.6 | 2.9 |
| C3, % Vol | 2.7 | 1.3 | 1.6 | 1.3 | 7.1 | 4.8 |
| C3, % Wt | 1.5 | 0.7 | 0.9 | 0.7 | 3.9 | 2.7 |
| C3=, % Vol | 7.8 | 4.2 | 5.0 | 3.6 | 6.5 | 5.5 |
| C3=, % Wt | 4.4 | 2.4 | 2.8 | 2.0 | 3.7 | 3.2 |
| C2, % Wt | 0.9 | 0.6 | 0.6 | 0.5 | 0.9 | 0.7 |
| C2=, % Wt | 0.4 | 0.3 | 0.3 | 0.2 | 1.0 | 0.7 |
| C1, % Wt | 0.9 | 0.5 | 0.6 | 0.4 | 0.9 | 0.7 |
| H2, % Wt | 0.05 | 0.03 | 0.08 | 0.06 | 0.04 | 0.0 |
| H2S, % Wt | 0.64 | 0.66 | 0.64 | 0.48 | 1.01 | 0.87 |
| Hydrogen Factor | 24 | 28 | 64 | 59 | 14 | 15 |
| Recovery, % Wt | 98.6 | 96.9 | 97.5 | 99.1 | 99.9 | 95.6 |
| Catalyst F—No | 23325 | 23325 | 23334 | 23334 | 23359 | 23359 |
| Run No F— | 14233 | 14237 | 14243 | 14245 | 14266 | 14267 |
| Chargestock | 22687 | 22687 | 22687 | 22687 | 22687 | 22687 |
| Alkylate, % Vol | 25.1 | 15.2 | 16.8 | 12.6 | 17.1 | 16.6 |
| $C_5$+ Gasoline + Alkylate, % Vol | 71.0 | 55.4 | 56.4 | 43.6 | 69.1 | 75.2 |
| Outside I—C4, % Vol | 9.0 | 7.0 | 7.4 | 5.7 | 0.5 | 1.1 |
| R O N +0, Raw Gasoline | 91.7 | 91.0 | 92.4 | 91.7 | 92.5 | 90.2 |
| R O N +0, $C_5$+ Gasoline | 91.2 | 90.7 | 92.0 | 91.3 | 91.9 | 90.1 |
| RON + 0, $C_5$+ Gasoline + Alkylate | 92.2 | 91.7 | 92.6 | 92.2 | 92.3 | 90.9 |
| LFO, % Wt | 28.4 | 36.4 | 36.4 | 39.3 | 17.7 | 20.9 |
| HFO, % Wt | 8.0 | 16.7 | 14.9 | 22.9 | 2.6 | 3.3 |
| G + D, % Wt | 66.1 | 69.7 | 69.3 | 65.1 | 60.3 | 68.8 |

TABLE 8

(Example 34)
MCM-41 VS USY AND SAC EFFECT OF TEMP - 900° F.
STEAMED 4 H, 1200° F., 45 PCT H2O, 0 PSIG
FIXED-FLUIDIZED BED, 900° F., 1 MIN ON-STREAM, JSHGO

|  | MCM-41 | MCM-41 | SAC | SAC | USY | USY |
|---|---|---|---|---|---|---|
| TREATMENT: HOURS | 4.0 | 4.0 | 4.0 | 4.0 | 4.0 | 4.0 |
| : TEMPERATURE, DEG° F. | 1200 | 1200 | 1200 | 1200 | 1200 | 1200 |
| : % STEAM | 45 | 45 | 45 | 0 | 45 | 45 |
| Cat/Oil | 4.97 | 1.99 | 5.01 | 2.00 | 3.97 | 2.00 |
| WHSV | 12.08 | 30.14 | 11.98 | 29.94 | 15.11 | 30.03 |
| Reaction Temperature, Deg° F. | 891 | 893 | 894 | 895 | 898 | 891 |
| Conversion, % Wt | 59.7 | 47.1 | 44.6 | 27.2 | 81.5 | 74.1 |
| Conversion, % Vol | 61.7 | 48.3 | 45.6 | 27.4 | 83.7 | 76.8 |
| C5+ Gasoline, % Vol | 44.8 | 40.5 | 36.4 | 22.3 | 53.6 | 59.3 |
| C5+ Gasoline, % Wt | 36.9 | 33.6 | 30.3 | 18.7 | 43.8 | 48.6 |
| TOTAL C4, % Vol | 13.2 | 8.2 | 7.8 | 4.5 | 19.9 | 15.5 |
| Dry Gas, % Wt | 7.5 | 5.0 | 4.3 | 2.8 | 11.0 | 7.7 |
| Coke, % Wt | 6.95 | 3.28 | 5.08 | 2.68 | 14.18 | 8.01 |
| C—On-Cay, Final, % Wt | 1.21 | 1.38 | 0.90 | 1.16 | 3.05 | 3.34 |
| N—C5, % Vol | 0.4 | 0.2 | 0.2 | 0.1 | 0.7 | 0.6 |
| I—C5, % Vol | 4.1 | 2.3 | 2.1 | 1.1 | 10.2 | 8.7 |
| C5=, % Vol | 3.6 | 3.4 | 2.7 | 1.8 | 1.2 | 1.7 |
| N—C4, % Vol | 0.8 | 0.5 | 0.5 | 0.4 | 2.6 | 1.7 |
| N—C4, % Wt | 0.5 | 0.3 | 0.3 | 0.2 | 1.7 | 1.1 |
| I—C4, % Vol | 6.8 | 3.5 | 3.3 | 1.5 | 14.2 | 10.3 |
| I—C4, % Wt | 4.2 | 2.1 | 2.0 | 0.9 | 8.7 | 6.3 |
| C4=, % Vol | 5.7 | 4.2 | 4.0 | 2.6 | 3.1 | 3.5 |
| C4=, % Wt | 3.8 | 2.8 | 2.7 | 1.7 | 2.0 | 2.4 |
| C3, % Vol | 2.3 | 1.3 | 1.2 | 0.8 | 7.4 | 4.2 |
| C3, % Wt | 1.3 | 0.7 | 0.7 | 0.4 | 4.1 | 2.3 |
| C3=, % Vol | 6.6 | 4.4 | 3.4 | 2.0 | 5.8 | 5.2 |
| C3=, % Wt | 3.8 | 2.5 | 2.0 | 1.1 | 3.3 | 3.0 |
| C2, % Wt | 0.7 | 0.5 | 0.4 | 0.3 | 0.9 | 0.5 |
| C2=, % Wt | 0.3 | 0.2 | 0.2 | 0.1 | 0.9 | 0.6 |
| C1, % Wt | 0.6 | 0.4 | 0.3 | 0.2 | 0.7 | 0.4 |
| H2, % Wt | 0.03 | 0.03 | 0.05 | 0.04 | 0.03 | 0.02 |
| H2S, % Wt | 0.78 | 0.67 | 0.68 | 0.61 | 1.12 | 0.96 |
| Hydrogen Factor | 24 | 27 | 64 | 67 | 15 | 17 |
| Recovery, % Wt | 97.3 | 94.4 | 100.1 | 97.5 | 97.9 | 95.8 |
| Catalyst F—No | 23325 | 23325 | 23334 | 23334 | 23359 | 23359 |
| Run No F— | 14241 | 14240 | 14249 | 14247 | 14269 | 14274 |
| Alkylate, % Vol | 20.5 | 14.4 | 12.4 | 7.7 | 14.7 | 14.6 |
| C5+ Gasoline + Alkylate, % Vol | 65.3 | 54.8 | 48.8 | 30.0 | 68.3 | 73.9 |
| Outside I—C4, % Vol | 7.2 | 6.3 | 5.1 | 3.7 | 3.9 | 0.2 |
| R O N +0, Raw Gasoline | 90.2 | 89.6 | 90.1 | 89.9 | 89.8 | 86.5 |
| R O N +0, C5+ Gasoline | 89.7 | 89.3 | 89.7 | 89.6 | 89.7 | 86.4 |
| RON + 0, C5+ Gasoline + Alkylate | 91.0 | 90.5 | 90.9 | 90.8 | 90.5 | 87.9 |
| LFO, % Wt | 32.8 | 38.5 | 38.3 | 40.8 | 16.4 | 22.4 |
| HFO, % Wt | 7.5 | 14.4 | 17.2 | 32.1 | 2.2 | 3.5 |
| G + D, % Wt | 69.7 | 72.1 | 68.5 | 59.5 | 60.2 | 71.0 |

TABLE 9

(Example 34)
MCM-41 VS USY AND SAC EFFECT OF TEMP - 860° F.
STEAMED 4 H, 1200° F., 45 PCT H2O, 0 PSIG
FIXED-FLUIDIZED BED, 860° F., 1 MIN ON-STREAM, JSHGO

|  | MCM-41 | MCM-41 | SAC | SAC | USY | USY |
|---|---|---|---|---|---|---|
| TREATMENT: HOURS | 4.0 | 4.0 | 4.0 | 4.0 | 4.0 | 4.0 |
| : TEMPERATURE, DEG° F. | 1200 | 1200 | 1200 | 1200 | 1200 | 1200 |
| : % STEAM | 45 | 45 | 45 | 45 | 45 | 45 |
| Cat/Oil | 5.01 | 2.01 | 4.97 | 2.00 | 3.97 | 2.00 |
| WHSV | 11.98 | 29.89 | 12.07 | 30.02 | 15.11 | 30.00 |
| Reaction Temperature, Deg° F. | 861 | 857 | 865 | 856 | 860 | 857 |
| Conversion, % Wt | 59.6 | 43.9 | 45.6 | 23.8 | 81.4 | 73.1 |
| Conversion, % Vol | 61.1 | 44.9 | 46.5 | 23.9 | 83.6 | 75.8 |
| C5+ Gasoline, % Vol | 45.0 | 37.9 | 38.6 | 20.7 | 56.6 | 59.7 |
| C5+ Gasoline, % Wt | 36.9 | 31.4 | 32.0 | 17.3 | 46.1 | 48.9 |
| TOTAL C4, % VOL | 13.1 | 8.4 | 7.7 | 2.9 | 18.4 | 14.4 |
| Dry Gas, % Wt | 6.9 | 3.9 | 3.8 | 2.0 | 9.3 | 6.9 |
| Coke, % Wt | 7.47 | 3.21 | 4.97 | 2.64 | 14.52 | 8.25 |
| C—On-Cat, Final, % Wt | 1.24 | 1.34 | 0.84 | 1.09 | 3.09 | 3.46 |
| N—C5, % Vol | 0.2 | 0.3 | 0.2 | 0.1 | 0.6 | 0.5 |
| I—C5, % Vol | 5.2 | 2.7 | 2.9 | 1.3 | 10.4 | 8.5 |
| C5=, % Vol | 3.1 | 3.2 | 2.5 | 1.4 | 1.0 | 1.4 |
| N—C4, % Vol | 0.8 | 0.5 | 0.5 | 0.2 | 2.3 | 1.5 |
| N—C4, % Wt | 0.5 | 0.3 | 0.3 | 0.1 | 1.4 | 1.0 |
| I—C4, % Vol | 7.0 | 3.6 | 3.6 | 1.1 | 13.7 | 9.9 |
| I—C4, % Wt | 4.3 | 2.2 | 2.2 | 0.7 | 8.4 | 6.1 |
| C4=, % Vol | 5.3 | 4.4 | 3.6 | 1.6 | 2.4 | 3.0 |

TABLE 9-continued (Example 34)
MCM-41 VS USY AND SAC EFFECT OF TEMP - 860° F.
STEAMED 4 H, 1200° F., 45 PCT H2O, 0 PSIG
FIXED-FLUIDIZED BED, 860° F., 1 MIN ON-STREAM, JSHGO

|  | MCM-41 | MCM-41 | SAC | SAC | USY | USY |
|---|---|---|---|---|---|---|
| C4=, % Wt | 3.5 | 2.9 | 2.4 | 1.1 | 1.6 | 2.0 |
| C3, % Vol | 2.2 | 1.1 | 1.0 | 0.5 | 6.6 | 3.8 |
| C3, % Wt | 1.2 | 0.6 | 0.6 | 0.3 | 3.7 | 2.1 |
| C3=, % Vol | 5.8 | 3.4 | 3.1 | 1.2 | 4.5 | 4.5 |
| C3=, % Wt | 3.3 | 2.0 | 1.8 | 0.7 | 2.6 | 2.6 |
| C2, % Wt | 0.6 | 0.3 | 0.3 | 0.2 | 0.6 | 0.4 |
| C2=, % Wt | 0.3 | 0.1 | 0.2 | 0.1 | 0.7 | 0.5 |
| C1, % Wt | 0.5 | 0.2 | 0.2 | 0.2 | 0.4 | 0.2 |
| H2, % Wt | 0.03 | 0.02 | 0.04 | 0.02 | 0.02 | 0.01 |
| H2S, % Wt | 0.92 | 0.61 | 0.67 | 0.54 | 1.18 | 1.02 |
| Hydrogen Factor | 25 | 27 | 65 | 61 | 14 | 14 |
| Recovery, % Wt | 93.5 | 94.4 | 94.8 | 92.5 | 96.9 | 96.6 |
| Catalyst F—No | 23325 | 23325 | 23334 | 23334 | 23359 | 23359 |
| Run No F— | 14252 | 14253 | 14250 | 14251 | 14276 | 14277 |
| Alkylate, % Vol | 18.5 | 13.1 | 11.2 | 4.8 | 11.4 | 12.4 |
| C5+ Gasoline + Aalkylate % Vol | 63.5 | 51.0 | 49.8 | 25.5 | 68.1 | 72.2 |
| Outside I—C4, % Vol | 5.7 | 5.2 | 3.9 | 2.1 | 5.6 | 1.3 |
| R O N +0, Raw Gasoline | 87.7 | 88.4 | 87.1 | 88.0 | 88.5 | 84.3 |
| R O N +0, C5+ Gasoline | 87.6 | 87.9 | 87.1 | 88.0 | 88.4 | 84.2 |
| RON + 0, C5+ Gasoline + Alkylate | 89.4 | 89.6 | 88.7 | 89.2 | 89.3 | 85.9 |
| LFO. % Wt | 33.1 | 39.5 | 39.7 | 41.7 | 16.5 | 23.5 |
| HFO, % Wt | 7.3 | 16.6 | 14.7 | 34.5 | 2.2 | 3.5 |
| G + D, % Wt | 70.0 | 70.9 | 71.6 | 59.0 | 62.6 | 72.4 |

TABLE 10

(Example 35)
35 PCT MCM-41 VS 35 PCT USY CRACKING JSHGO
STEAMING 1200° F., 4 H FOR MCM-41 1450° F., 10 H FOR
USY FIXED-FLUIDIZED BED, 960° F., 1 MIN
ON-STREAM, JSHGO

|  | MCM-41 | USY | DELTA |
|---|---|---|---|
| Conversion, % Vol | 65.0 | 65.0 | 0.0 |
| Conversion, % Wt | 62.7 | 62.0 | 0.7 |
| C5+ Gasoline, % Vol | 45.5 | 52.1 | −6.6 |
| C5+ Gasoline, % Wt | 37.4 | 43.2 | −5.8 |
| TOTAL C4, % Vol | 16.1 | 14.2 | 1.9 |
| Dry Gas, % Wt | 9.2 | 7.7 | 1.4 |
| Coke, % Wt | 6.00 | 2.40 | 3.60 |
| C—On-Cat, Final, % Wt | 1.07 | 0.55 | 0.52 |
| N—C5, % Vol | 0.4 | 0.4 | 0.0 |
| I—C5, % Vol | 4.8 | 4.8 | 0.0 |
| C5=, % Vol | 4.5 | 5.0 | −0.5 |
| N—C4, % Vol | 1.0 | 1.0 | 0.0 |
| N—C4, % Wt | 0.6 | 0.6 | 0.0 |
| I—C4, % Vol | 7.8 | 6.1 | 1.7 |
| I—C4, % Wt | 4.8 | 3.7 | 1.1 |
| C4=, % Vol | 7.3 | 7.1 | 0.2 |
| C4=, % Wt | 4.8 | 4.7 | 0.1 |
| C3, % Vol | 2.7 | 2.2 | 0.5 |
| C3, % Wt | 1.5 | 1.2 | 0.3 |
| C3=, % Vol | 8.0 | 6.6 | 1.4 |
| C3=, % Wt | 4.5 | 3.7 | 0.8 |
| C2, % Wt | 0.9 | 0.7 | 0.3 |
| C2=, % Wt | 0.5 | 0.6 | −0.1 |
| C1, % Wt | 0.9 | 0.6 | 0.3 |
| H2, % Wt | 0.05 | 0.03 | 0.02 |
| H2S, % Wt | 0.72 | 0.83 | −0.11 |
| Hydrogen Factor | 23 | 18 | 5 |
| Alkylate, % Vol | 25.4 | 22.8 | 2.5 |
| C5+ Gasoline + Alkylate, % Vol | 70.7 | 74.3 | −3.7 |
| Outside I—C4, % Vol | 9.5 | 9.4 | 0.1 |
| R O N +0, C5+ Gasoline | 92.1 | 91.6 | 0.5 |
| RON + 0, C5+ Gasoline + Alkylate | 92.8 | 92.4 | 0.4 |
| LFO, % Wt | 28.9 | 28.1 | 0.8 |
| HFO. % Wt | 8.3 | 9.8 | −1.5 |
| G + D, % Wt | 66.2 | 70.8 | −4.7 |

TABLE 11

(Example 36)
35 PCT MCM-41 VS 35 PCT USY CRACKING ALAR
STEAMING 1200° F., 4 H FOR MCM-41 1450° F.,
10 H FOR USY FIXED-FLUIDIZED BED,
960° F., 1 MIN ON-STREAM, ALAR

|  | MCM-41 | USY | DELTA |
|---|---|---|---|
| Conversion, % Vol | 67.0 | 67.0 | 0.0 |
| Conversion, % Wt | 65.8 | 64.2 | 1.6 |
| C5+ Gasoline, % Vol | 42.3 | 51.7 | −9.4 |
| C5+ Gasloine, % Wt | 34.1 | 42.1 | −8.1 |
| TOTAL C4, % Vol | 17.1 | 15.1 | 2.0 |
| Dry Gas, % Wt | 12.8 | 9.3 | 3.5 |
| Coke, % Wt | 8.17 | 3.12 | 5.05 |
| C-On-Cat, Final, % Wt | 1.30 | 0.81 | 0.49 |
| N-C5, % Vol | 0.6 | 0.5 | 0.1 |
| I-C5, % Vol | 4.9 | 5.9 | −1.1 |
| C5=, % Vol | 5.1 | 4.8 | 0.3 |
| N-C4, % Vol | 1.3 | 1.2 | 0.1 |
| N-C4, % Wt | 0.8 | 0.8 | 0.1 |
| I-C4, % Vol | 7.3 | 6.7 | 0.5 |
| I-C4, % Wt | 4.4 | 4.1 | 0.3 |
| C4=, % Vol | 8.5 | 7.2 | 1.3 |
| C4=, % Wt | 5.6 | 4.7 | 0.8 |
| C3, % Vol | 3.7 | 3.0 | 0.7 |
| C3, % Wt | 2.0 | 1.6 | 0.4 |
| C3=, % Vol | 9.9 | 7.5 | 2.4 |
| C3=, % Wt | 5.5 | 4.2 | 1.3 |
| C2, % Wt | 1.5 | 0.9 | 0.6 |
| C2=, % Wt | 0.9 | 0.7 | 0.1 |
| C1, % Wt | 1.7 | 1.0 | 0.7 |
| H2, % Wt | 0.11 | 0.05 | 0.06 |
| H2S, % Wt | 1.00 | 0.68 | 0.31 |
| Hydrogen Factor | 30 | 20 | 10 |
| Alkylate, % Vol | 30.6 | 24.5 | 6.1 |
| C5+ Gasoline + Alkylate, % Vol | 72.8 | 76.4 | −3.6 |
| Outside I-C4, % Vol | 13.6 | 10.0 | 3.7 |
| RON + 0, C5+ Gasoline | 90.6 | — |  |
| RON + 0, C5+ Gasoline + Alkylate | 92.0 | — |  |
| LFO, % Wt | 27.8 | 27.9 | −0.1 |
| HFO, % Wt | 6.3 | 7.9 | −1.6 |
| G + D, % Wt | 61.8 | 70.2 | −8.4 |

TABLE 12

(Example 37)
MCM-41 VS 10 PCT USY AND 50/50 BLEND
STEAMING 1200° F., 4 H FOR MCM-41, 1450° F., 10 H
FOR USY FIXED-FLUIDIZED BED, 860° F., 1 MIN ON-
STREAM, ALAR

|  | MCM-41 | 50/50 BLEND MCM-41/USY | 10 PCT USY |
|---|---|---|---|
| Conversion, % Vol | 60.0 | 60.0 | 60.0 |
| Conversion, % Wt | 59.1 | 58.8 | 58.4 |
| C5+ Gasoline, % Vol | 42.2 | 44.5 | 46.6 |
| C5+ Gasoline, % Wt | 34.2 | 36.4 | 38.2 |
| TOTAL C4, % Vol | 14.4 | 12.2 | 12.2 |
| Dry Gas, % Wt | 9.4 | 9.3 | 7.7 |
| Coke, % Wt | 6.34 | 5.81 | 5.21 |
| C-On-Cat, Final, % Wt | 1.79 | 1.18 | 0.79 |
| N—C5, % Vol | 0.4 | 0.4 | 0.3 |
| I—C5, % Vol | 3.8 | 3.4 | 3.5 |
| C5=, % Vol | 5.2 | 4.3 | 4.3 |
| N—C4, % Vol | 1.0 | 0.9 | 0.9 |
| N—C4, % Wt | 0.6 | 0.6 | 0.5 |
| I—C4, % Vol | 5.5 | 4.8 | 4.7 |
| I—C4, % Wt | 3.3 | 2.9 | 2.9 |
| C4=, % Vol | 7.9 | 6.4 | 6.6 |
| C4=, % Wt | 5.2 | 4.2 | 4.3 |
| C3, % Vol | 2.6 | 2.5 | 2.1 |
| C3, % Wt | 1.4 | 1.4 | 1.2 |
| C3=, % Vol | 7.5 | 7.4 | 6.5 |
| C3=, % Wt | 4.2 | 4.2 | 3.7 |
| C2, % Wt | 1.1 | 1.1 | 0.7 |
| C2=, % Wt | 0.6 | 0.6 | 0.5 |
| C1, % Wt | 1.2 | 1.1 | 0.8 |
| H2, % Wt | 0.09 | 0.08 | 0.04 |
| H2S, % Wt | 0.86 | 0.85 | 0.69 |
| Hydrogen Factor | 33 | 31 | 24 |
| Alkylate % Vol | 25.8 | 23.1 | 21.9 |
| C5+ Gasoline + Alkylate, % Vol | 68.5 | 66.6 | 67.9 |
| OUTSIDE I—C4, % VOL | 12.0 | 10.9 | 10.1 |
| R O N +0, C5+ Gasoline | 90.2 | — | 89.7 |
| RON + 0, C5+ Gasoline + Alkylate | 91.6 | — | 91.1 |
| LFO, % Wt | 33.0 | 31.2 | 32.8 |
| HFO, % Wt | 7.7 | 10.0 | 8.8 |
| G + D, % Wt | 67.6 | 66.8 | 70.6 |

TABLE 13

Properties Of Cracked Gasoline
Comparison of MCM-41 to Silica-Alumina-Clay
Run Conditions: JSHGO, Cat/Oil = 4, 960° F., 1.0 min-on-feed
Description of CutPoints
Gasoline - 390° 90% EP
LFO - 390° to 690° EP
HFO - 690°+
Gasoline

| Property | MCM-41 | SAC |
|---|---|---|
| PONA (M1270-2) | | |
| Paraffins, wt % | 15.9 | 12.9 |
| Cyclo Paraffins | 11.3 | 9.3 |
| Mono Olefins, wt % | 23.2 | 27.4 |
| Di-cyclo Paraffins, wt % | 0.8 | 0.7 |
| Cy-Olefins and Di-olefins, wt % | 11.2 | 18.1 |
| CnH2n-4, wt % | 0.3 | 1.8 |
| Alkylbenzenes, wt % | 30.5 | 23.7 |
| Indanes and Tetralins, wt % | 5.4 | 4.9 |
| Naphthalenes, wt % | 1.5 | 1.2 |
| Sample Mol Wt. | 112.4 | 113.8 |
| Paraffins Mol. Wt. | 112.2 | 115.2 |
| Alkyl Benzene Mol Wt. D1019 | 115.1 | 114.5 |
| Aromatics + Olefins, vol % | 64.8 | 71.7 |
| Aromatic Sulfur, wt % | 1.4 | |
| Benzene, vol % | 0.8 | 0.8 |

TABLE 14

Properties of Light Fuel Oil
Comparison of MCM-41 to Silica-Alumina-Clay
Run conditions: JSHGO, Cat/Oil = 4, 960° F., 1.0 min-on-feed
Light Fuel Oil - 390° to 690° EP

| Property | MCM-41 | SAC |
|---|---|---|
| Kinematic Viscosity, cS | | |
| 100° C. | 1.467 | 1.492 |
| 40° C. | 4.349 | 4.451 |
| Pour point, °F. | 25 | 10 |
| Ave. Mol. Weight, D, M1085-3 | 204 | 217 |
| Aromatics, wt % | 64.2 | 56.4 |
| Non-Aromatic, wt % | 27.5 | 35.4 |
| Loss, wt % | 8.4 | 8.2 |
| Paraffins, wt % | 18.7 | 20.0 |
| Mono Naphthenes, wt % | 5.5 | 8.9 |
| Poly Naphthenes, wt % | 5.7 | 9.7 |
| Aromatics, wt % | 70.1 | 61.4 |
| % S (aromatic) | 3.0 | 2.5 |
| % CA | 49.3 | 37.8 |
| C/H (aromatic) | 0.8 | 0.8 |

TABLE 15

Properties of Heavy Fuel Oil
Comparison of MCM-41 to Silica-Alumina-Clay
Run conditions: JSHGO, Cat/Oil = 4, 960° F., 1.0 min-on-feed
Heavy Fuel Oil - 690° F.+

| Property | MCM-41 | SAC |
|---|---|---|
| Kinematic Viscosity, cS | | |
| 100° C. | 12.4 | 5.86 |
| 40° C. | 83.8 | 41.5 |
| Pour Point, °F. | 100 | 95 |
| Ave. Mol. Weight, D, M1085-6 | 310 | 326 |
| Aromatics, wt % | 66.5 | 51.5 |
| Non-Aromatic, wt % | 30.9 | 49.6 |
| Loss, wt % | 2.6 | — |
| Paraffins, wt % | 18.7 | 25.9 |
| Mono Naphthenes, wt % | 5.5 | 7.7 |
| Poly Naphthenes, wt % | 5.7 | 15.4 |
| Aromatics, wt % | 70.1 | 51.0 |
| Aromatic Sulfur Types | 9.5 | 8.8 |
| % S (aromatic) | 1.4 | 1.7 |
| % CA | 43.1 | 28.6 |
| C/H (aromatic) | 0.8 | 0.8 |

These data show the effectiveness of MCM-41 in catalytic cracking.

The MCM-41 material has a relatively low density, in large part due to the presence of extremely large pores. To keep the MCM-41 containing cracking catalyst in the unit longer it may be beneficial to add a conventional weighting agent to the catalyst, or preferably to use large size particles. Use of catalyst having an average particle diameter in excess of 100 microns will be beneficial, with particle diameters of up to 300 microns being preferred.

The MCM-41 material has a relatively low thermal and hydrothermal stability. To compensate, more MCM-41 material may be used in the cracking catalyst, with more than 50 wt % MCM-41 being preferred for many uses. Most preferably the cracking catalyst will contain up to 70 or 80 wt % of such ultra large pore materials, or even more.

While the preferred MCM-41 material has a hexagonal arrangement of uniformly-sized pores, it is not essential that all pores of the material have the same pore size, i.e., bi-modal, or greater, pore distributions are contemplated.

We claim:

1. In a catalytic cracking process wherein a crackable hydrocarbon feedstock is cracked in a catalytic cracking means at catalytic cracking conditions by contact with a circulating inventory of catalytic cracking catalyst to produce catalytically cracked products, the improvement comprising use of a cracking catalyst comprising catalytically effective amounts of a non-layered, ultra large pore crystalline material exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C.

2. The process of claim 1 wherein the cracking catalyst inventory contains 10 to 80 wt % of said crystalline material.

3. The process of claim 1 wherein the cracking catalyst inventory contains catalytically effective amounts of at least one shape selective zeolite having a constraint index of 1-12.

4. The process of claim 3 wherein the shape selective zeolite is selected from the group of ZSM-5, ZSM-11, ZSM-12, ZSM-23, ZSM-35, ZSM-48, ZSM-57 and MCM-22.

5. The process of claim 4 wherein the shape selective zeolite is ZSM-5.

6. The process of claim 1 wherein the ultra large pore crystalline material is MCM-41.

7. The process of claim 1 wherein the ultra large pore crystalline material is an aluminosilicate.

8. The process of claim 1 wherein the catalyst inventory contains a catalytically effective amount of a large molecular sieve selected from the group of zeolite X, zeolite Y, rare earth Y, dealuminized Y, ultrahydrophobic Y, silicon enriched dealuminized Y zeolite and zeolite beta.

9. The process of claim 1 wherein the cracking process is conducted in a fluidized catalytic cracking reactor at fluidized catalytic cracking conditions.

10. In a catalytic cracking process comprising contacting a crackable hydrocarbon feedstock at catalytic cracking conditions in a catalytic cracking means with an inventory of catalytic cracking catalyst to produce catalytically cracked products, the improvement comprising use of a cracking catalyst comprising catalytically effective amounts of an ultra large pore crystalline material which is an inorganic, porous crystalline material having, after calcination, a hexagonal arrangement of pores having diameters of at least about 13 Angstrom Units and exhibiting a hexagonal electron diffraction pattern that can be indexed with a $d_{100}$ value greater than about 18 Angstrom Units.

11. The process of claim 10 wherein the cracking catalyst inventory contains 10 to 80 wt % of said crystalline material.

12. The process of claim 10 wherein the cracking catalyst inventory contains catalytically effective amounts of at least one shape selective zeolite having a constraint index of 1-12.

13. The process of claim 12 wherein the shape selective zeolite is selected from the group of ZSM-5, ZSM-11, ZSM-12, ZSM-23, ZSM-35, ZSM-48, ZSM-57 and MCM-22.

14. The process of claim 13 wherein the shape selective zeolite is ZSM-5.

15. The process of claim 10 wherein the ultra large pore crystalline material is MCM-41.

16. The process of claim 10 wherein the ultra large pore crystalline material is an aluminosilicate.

17. The process of claim 10 wherein the cracking process is conducted in a fluidized catalytic cracking reactor at fluidized catalytic cracking conditions.

18. A catalytic cracking catalyst for catalytic cracking of a hydrocarbon feedstock containing at least 10 wt % of hydrocarbons boiling above about 950° F., in the absence of added hydrogen, to lighter products, comprising:

15 to 50 wt % non-layered, ultra large pore crystalline material exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C. and being essentially free of added hydrogenation components; and a matrix.

19. The catalyst of claim 18 having an average particle size within the range of about 50 to about 300 microns.

20. The catalyst of claim 18 wherein the ultra large pore material is MCM-41.

* * * * *